(12) United States Patent
Lin et al.

(10) Patent No.: US 11,715,832 B2
(45) Date of Patent: Aug. 1, 2023

(54) ELECTROCHEMICALLY STABLE ANODE ACTIVE MATERIAL FOR LITHIUM-ION BATTERIES AND PRODUCTION METHOD

(71) Applicant: Nanotek Instruments, Inc., Dayton, OH (US)

(72) Inventors: Yen-Po Lin, Hsinchu (TW); Yu-Chan Yen, Dayton, OH (US); Yu-Sheng Su, Dayton, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 102 days.

(21) Appl. No.: 16/538,253

(22) Filed: Aug. 12, 2019

(65) Prior Publication Data

US 2021/0050597 A1 Feb. 18, 2021

(51) Int. Cl.
*H01M 4/62* (2006.01)
*H01M 4/36* (2006.01)
*H01M 10/0525* (2010.01)
*H01M 4/02* (2006.01)

(52) U.S. Cl.
CPC .......... *H01M 4/628* (2013.01); *H01M 4/366* (2013.01); *H01M 10/0525* (2013.01); *H01M 2004/027* (2013.01)

(58) Field of Classification Search
CPC ....... H01M 10/0525; H01M 2004/027; H01M 4/366; H01M 4/628
See application file for complete search history.

(56) References Cited

U.S. PATENT DOCUMENTS

| | | |
|---|---|---|
| 4,980,250 A | 12/1990 | Takahashi et al. |
| 5,601,951 A | 2/1997 | Johnson et al. |
| 6,335,115 B1 | 1/2002 | Meissner |
| 6,706,447 B2 | 3/2004 | Gao et al. |
| 7,094,499 B1 | 8/2006 | Hung |
| 7,276,314 B2 | 10/2007 | Gao et al. |
| 2002/0102205 A1* | 8/2002 | Amatucci ........... H01M 4/5825 423/598 |
| 2005/0130043 A1 | 6/2005 | Gao et al. |

(Continued)

OTHER PUBLICATIONS

T. Feng, Y. Xu, Z. Zhang, X. Du, X. Sun, L. Xiong, R. Rodriguez, R. Holze. Low-Cost Al2O3 Coating Layer As a Preformed SEI on Natural Graphie Power To Improve Coulombic Efficiency and High-Rate Cycling Stability of Lithium-Ion Batteries, ACS Appl. Mater. Interfaces, Aug. 2016, 6512-6519.*

(Continued)

*Primary Examiner* — Carlos Barcena

(57) ABSTRACT

Provided is anode active material for use in a lithium ion battery, wherein the anode active material is capable of reversibly storing lithium ions therein up to a maximum lithium storage capacity $C_{max}$ during a charge or discharge of the battery and the anode active material comprises an amount of solid-electrolyte interphase (SEI) on a surface or in an internal structure of the anode active material wherein the SEI is pre-formed prior to incorporating the anode active material in an anode electrode of the battery. Also provided is a method of producing the pre-formed SEI substances in the anode material; e.g. through repeated lithiation/delithiation procedures.

30 Claims, 8 Drawing Sheets

(56) References Cited

U.S. PATENT DOCUMENTS

| | | | | |
|---|---|---|---|---|
| 2013/0266875 | A1* | 10/2013 | Matsumoto | H01M 10/056 429/338 |
| 2015/0236343 | A1* | 8/2015 | Xiao | H01M 4/13 429/217 |
| 2016/0141608 | A1* | 5/2016 | Ryu | H01M 4/485 429/231.95 |
| 2019/0027736 | A1* | 1/2019 | Schramm | H01M 10/446 |
| 2019/0326625 | A1* | 10/2019 | Cheng | H01M 10/0562 |
| 2019/0355980 | A1* | 11/2019 | Holt | H01M 4/628 |
| 2020/0161635 | A1* | 5/2020 | Liu | H01M 4/133 |
| 2022/0149342 | A1* | 5/2022 | Basu | H01M 4/622 |

OTHER PUBLICATIONS

A. Wang, S. Kadam, H. Li, S. Shi, Y. Qi. Review on modeling of the anode solid electrolyte interphase (SEI) for lithium-ion batteries, npj Computational Materials (2018) 4:15.*

S. Menkin, D. Golodnitsky, E. Peled. Artificial solid-electrolyte interphase (SEI) for improved cycleability and safety of lithium-ion cells for EV applications, Electrochemistry Communications 11 (2009) 1789-1791.*

J. Zhao, Z. Lu, H. Wang, W. Liu, H.-W. Lee, K. Yan, D. Zhuo, D. Lin, N. Liu, Y. Cui. Artificial Solid Electrolyte Interphase-Protected LixSi Nanoparticles: An Efficient and Stable Prelithiation Reagent for Lithium-Ion Batteries, J. Am. Chem. Soc. 2015, 137, 8372-8375.*

L. Zhang, K. Zhang, Z. Shi, S. Zhang. LiF as an Artificial SEI Layer to Enhance the High-Temperature Cycle Performance of $Li_4Ti_5O_{12}$, Langmuir 2017, 33, 11164-11169.*

F. Holtstiege, P. Bärmann, R. Nölle, M. Winter, T. Placke. Pre-Lithiation Strategies for Rechargeable Energy Storage Technologies: Concepts, Promises and Challenges, Batteries, Apr. 4, 2018; doi:10.3390/batteries4010004.*

Umeno et al. "Novel Anode Material for Lithium-Ion Batteries: Carbon-coated Silicon Prepared by Thermal Vapor Decomposition" Chemistry Letters (2001) pp. 1186-1187.

* cited by examiner

ELECTROCHEMICALLY STABLE ANODE ACTIVE MATERIAL FOR LITHIUM-ION BATTERIES AND PRODUCTION METHOD

FIELD

The present disclosure provides an anode active material, an anode electrode containing such an anode material and a lithium-ion battery comprising such an anode. Also provided is a method of producing such an anode material, anode electrode, and battery.

BACKGROUND

Concerns over the safety of earlier lithium secondary batteries led to the development of lithium ion secondary batteries, in which pure lithium metal sheet or film was replaced by carbonaceous materials as the negative electrode (anode). The carbonaceous material may comprise primarily graphite that is intercalated with lithium and the resulting graphite intercalation compound may be expressed as $Li_xC_6$, where x is typically less than 1. In order to minimize the loss in energy density due to this replacement, x in $Li_xC_6$ must be maximized and the irreversible capacity loss $Q_{ir}$ in the first charge of the battery must be minimized. The maximum amount of lithium that can be reversibly intercalated into the interstices between graphene planes of a perfect graphite crystal is generally believed to occur in a graphite intercalation compound represented by $Li_xC_6$ (x=1), corresponding to a theoretical specific capacity of 372 mAh/g.

In addition to carbon- or graphite-based anode materials, other inorganic materials that have been evaluated for potential anode applications include metal oxides, metal nitrides, metal sulfides, and a range of metals, metal alloys, and intermetallic compounds that can accommodate lithium atoms/ions. In particular, lithium alloys having a composition formula of $Li_aA$ (A is a metal such as Al, and "a" satisfies 0<a<5) has been investigated as potential anode materials. This class of anode active materials has a higher theoretical capacity, e.g., $Li_4Si$ (maximum capacity=3,829 mAh/g), $Li_{4.4}Si$ (maximum capacity of Si=4,200 mAh/g), $Li_{4.4}Ge$ (maximum capacity of Ge=1,623 mAh/g), $Li_{4.4}Sn$ (maximum capacity of Sn=993 mAh/g), $Li_3Cd$ (maximum capacity of Cd=715 mAh/g), $Li_3Sb$ (maximum capacity of Sb=660 mAh/g), $Li_{4.4}Pb$ (569 mAh/g), LiZn (410 mAh/g), and $Li_3Bi$ (385 mAh/g).

An anode active material is normally used in a powder form, which is mixed with conductive additives and bonded by a binder resin. The binder also serves to bond the mixture to a current collector. Alternatively, an anode active material may be coated as a thin film onto a current collector. On repeated charge and discharge operations, the alloy particles tend to undergo pulverization and the current collector-supported thin films are prone to fragmentation due to expansion and contraction of the anode active material during the insertion and extraction of lithium ions. This pulverization or fragmentation results in loss of particle-to-particle contacts between the active material and the conductive additive or contacts between the anode material and its current collector. These adverse effects result in a significantly shortened charge-discharge cycle life.

To overcome the problems associated with such mechanical degradation, several approaches have been proposed, including (a) using nano-scaled particles of an anode active material, (b) composites composed of small electrochemically active particles supported by less active or non-active matrices or coatings, and (c) metal alloying. Examples of more promising active particles are Si, Sn, and $SnO_2$. For instance, Umeno, et al. ["Novel Anode Material for Lithium-Ion Batteries: Carbon-coated Silicon Prepared by Thermal Vapor Decomposition," Chemistry Letters, (2001) pp. 1186-1187] proposed an anode based on carbon-coated silicon prepared by thermal vapor decomposition. Although a specific capacity as high as 800-1,450 mAh/g was achieved, the capacity faded rapidly after 40 cycles. Hung [C. C. Hung, "Carbon Materials Metal/Metal Oxide Nanoparticle Composite and Battery Anode Composed of the Same, U.S. Pat. No. 7,094,499 (Aug. 22, 2006)] disclosed a method of forming a composite anode material. The steps include selecting a carbon material as a constituent part of the composite, chemically treating the selected carbon material to receive nanoparticles, incorporating nanoparticles into the chemically treated carbon material, and removing surface nanoparticles from an outside surface of the carbon material with incorporated nanoparticles. A material making up the nanoparticles alloys with lithium. The resulting carbon/nanoparticle composite anodes did not exhibit any significant increase in capacity, mostly lower than 400 mAh/g. In fact, most of prior art composite electrodes have deficiencies in some ways, e.g., in most cases, less than satisfactory reversible capacity, poor cycling stability, high irreversible capacity, ineffectiveness in reducing the internal stress or strain during the lithium ion insertion and extraction cycles, and some undesirable side effects.

The positive electrode (cathode) active material of a lithium-ion battery is typically selected from a broad array of lithium-containing or lithium-accommodating oxides, such as lithium manganese dioxide, lithium manganese composite oxide, lithium nickel oxide, lithium cobalt oxide, lithium nickel cobalt oxide, lithium vanadium oxide, and lithium iron phosphate. These prior art materials do not offer a high lithium insertion capacity and this capacity also tends to decay rapidly upon repeated charging and discharging. A practical specific capacity of a cathode material has been, at the most, up to 200 mAh/g of the cathode active material, which rapidly decays as the charge-discharge cycling operation proceeds. Since the cathode specific capacity is relatively low, there is a strong desire to make use of a cathode active material to its full capacity.

As a lithium-ion cell is charged and discharged, lithium is alternately stored in the cathode and in the anode, so that the total amount of cyclable charge corresponds to the amount of lithium shuttling back and forth between the two electrodes. However, when the cell is assembled, usually the cathode active material is made to store the amount of lithium available for the subsequent cyclic operation.

When the lithium-ion cell is assembled and filled with electrolyte, the anode and cathode active materials have a difference in potential of at most about 2 volts between each other. The difference in potential between the two electrodes, after the lithium-ion cell has been charged, is about 4 volts. When the lithium-ion cell is charged for the first time, lithium is extracted from the cathode and introduced into the anode. As a result, the anode potential is lowered significantly (toward the potential of metallic lithium), and the cathode potential is further increased (to become even more positive). These changes in potential may give rise to parasitic reactions on both electrodes, but more severely on the anode. For example, a decomposition product known as solid electrolyte interface (SEI) readily forms on the surfaces of carbon anodes, wherein the SEI layer comprises lithium and electrolyte components. These surface layers or covering layers are lithium-ion conductors which establish an ionic connection between the anode and the electrolyte and prevent the reactions from proceeding any further.

Formation of this SEI layer is therefore necessary for the stability of the half-cell system comprising the anode and the electrolyte. However, as the SEI layer is formed, a portion of the lithium introduced into the cells via the cathode is irreversibly bound and thus removed from cyclic operation, i.e. from the capacity available to the user. This means that, during the course of the first discharge, not as much lithium moves from the anode back to the cathode as had previously been released to the anode during the first charging operation. This phenomenon is called irreversible capacity and is known to consume about 10% to 30% of the capacity of a lithium ion cell.

A further drawback is that the formation of the SEI layer on the anode after the first charging operation may be incomplete and will continue to progress during the subsequent charging and discharge cycles. Even though this process becomes less pronounced with an increasing number of repeated charging and discharge cycles, it still causes continuous abstraction, from the system, of lithium which is no longer available for cyclic operation and thus for the capacity of the cell. Additionally, as indicated earlier, the formation of a solid-electrolyte interface layer consumes about 10% to 30% of the amount of lithium originally stored at the cathode, which is already low in capacity (typically <200 mAh/g). Clearly, it would be a significant advantage if the initial amount of lithium stored in the cathode (when the cell is assembled) does not suffer any significant loss during the first or subsequent cycles.

Takahashi, et al. ["Secondary Battery," U.S. Pat. No. 4,980,250, Dec. 25, 1990], disclosed methods by means of which lithium is introduced into a "carbon molded article" anode active material (containing carbon fiber or powder) in order to minimize the lithium consumption and thus the irreversible capacity loss. However, prelithiated carbon- or graphite-based anode active materials lead to electrodes which can be handled only under non-oxidizing and dry conditions, making practical production of lithium ion batteries difficult.

Meissner [E. Meissner, "Secondary Lithium-ion Cell with an Auxiliary Electrode," U.S. Pat. No. 6,335,115 (Jan. 1, 2002)] disclosed a secondary lithium-ion cell which includes a lithium-intercalating, carbon-containing anode, a non-aqueous lithium ion-conducting electrolyte, and a lithium-intercalating cathode including a lithium-containing chalcogen compound of a transition metal, and a lithium-containing auxiliary electrode disposed in the cell to compensate for the irreversible capacity loss in the secondary lithium-ion cell. This auxiliary electrode is spatially separated from the electrolyte when the cell is positioned in a first orientation and contacts the electrolyte when the cell is oriented in a second position, for supplying additional lithium to the cell. Such an additional electrode makes the battery very complicated and difficult to make. Switching between two orientations is not a good strategy since it would complicate the handling of the battery and an average consumer would not pay attention to such a detail to ensure proper operation of such a battery.

The approach of using a sacrificial electrode, in addition to an anode and a cathode in a cell, was also proposed earlier by Johnson, et al. ["Rechargeable Lithium Ion Cell," U.S. Pat. No. 5,601,951, (Feb. 11, 1997)]. Again, this additional electrode further complicates the manufacture and operation of a resulting battery. The assembling operation of a battery containing a highly reactive lithium metal or alloy electrode must be handled in an oxygen-free and moisture-free environment.

Gao, et al. [Y. Gao, et al., "Lithium Metal Dispersion in Secondary Battery Anode," U.S. Pat. No. 6,706,447, Mar. 16, 2004 and U.S. Pat. No. 7,276,314 (Oct. 2, 2007)] disclosed a secondary battery containing an anode that is formed of a host material capable of absorbing and desorbing lithium in an electrochemical system and lithium metal dispersed in the host material. The lithium metal is a finely divided lithium powder and preferably has a mean particle size of less than about 20 microns. The host material comprises one or more materials selected from the group consisting of carbonaceous materials (e.g., graphite), Si, Sn, tin oxides, composite tin alloys, transition metal oxides, lithium metal nitrides and lithium metal oxides. The method of preparing such an anode includes the steps of providing a host material, dispersing lithium metal in the host material, and then forming the host material and the lithium metal dispersed therein into an anode. The lithium metal and the host material is mixed together with a non-aqueous liquid to produce a slurry and then applied to a current collector and dried to form the anode. Alternatively, the anode can be formed by chemical means by immersing the host material in a suspension of lithium metal in a non-aqueous liquid, and then formed into an anode. The approach of Gao, et al. has the following serious drawbacks:

(1) The anode is composed of an anode active material (e.g., graphite or Sn particles) and a discrete lithium metal phase (fine Li metal powder particles) forming a mixture of two types of particles. This implies that the anode still contains highly active lithium particles that are sensitive to oxygen and moisture and must be handled under very stringent conditions.

(2) The amount of lithium metal present in the anode is prescribed to be no more than the maximum amount sufficient to intercalate in, alloy with, or be absorbed by the host material in the anode. For example, if the host material is carbon, the amount of lithium is no more than the amount needed to make $LiC_6$. This implies that the amount of lithium needed for the SEI formation was not considered and, hence, the resulting battery will suffer a capacity loss of 10%-30% after the first cycle.

(3) It is of significance to note that although Gao, et al. mentioned in passing that the anode active material can be a mixture of carbon, Sn, Si, etc, the mixture still further contains lithium metal powder particles as an additional, discrete phase that is un-protected. The resulting multi-component, multi-phase mixture is still sensitive to the presence of oxygen and water contents in the air, thus significantly complicating the battery manufacturing operations.

(4) In a follow-on patent application, Gao, et al. [Y. Gao, et al. "Lithium metal dispersion in electrodes," US Patent Application Pub. No. 2005/0130043 (Jun. 16, 2005)] suggested methods of lithiating an electrode prior to combining electrodes and other components to form a battery. In all cases, the electrode is composed of a mixture of discrete lithium metal particles or wire screen and powder particles of a host material, the latter being partially lithiated. As shown in FIG. 1 of Gao, et al., the anode comprises discrete lithium metal particles and a host material. Both the discrete lithium metal particles and lithiated carbonaceous material (graphite) are unstable in an oxygen- or moisture-containing environment. Furthermore, Gao, et al. have not fairly suggested how other anode active materials than graphite can be prelithiated in a controlled manner (e.g., without inducing a lithium coating on the surface of active material particles). In fact, no example was given to illustrate if or how other important anode active materials can be successfully prelithiated prior to battery production. No battery testing or electrochemical performance evaluation data was given in any of Gao's patent or patent application to demonstrate the advantages of their electrodes.

Therefore, there exists an urgent need for a secondary lithium ion battery that has one or more of the following features or advantages:
a) The battery does not contain a sacrificial electrode or an extra electrode in addition to an anode and cathode in a cell;
b) The battery comprises an anode that does not contain a discrete lithium metal phase or lithium metal powder particles dispersed in the anode;
c) The battery contains an anode that comprises previously formed SEI so that the initial amount of lithium stored in the cathode does not suffer any significant loss during the first or subsequent cycles; and
d) The battery features a long and stable cycle life.

Therefore, in summary, a need exists for an anode active material that has a high specific capacity, a minimal irreversible capacity (or a low capacity decay rate), and a long cycle life. In order to accomplish these goals, we have worked diligently and intensively on the development of new electrode materials. These research and development efforts lead to the present patent application.

SUMMARY

In certain embodiments, the disclosure provides an anode active material in a particle form (or multiple anode active material particles), coating form, or thin film form for use in a lithium-ion battery. There is no restriction on the form factor (shape and size) of the anode active material.

In certain embodiments, the anode active material is capable of reversibly storing lithium ions therein up to a maximum lithium storage capacity $C_{max}$ during a charge or discharge of the battery and the anode active material comprises an amount of solid-electrolyte interphase (SEI) on a surface or in an internal structure of the anode active material wherein the SEI is pre-formed prior to incorporating the anode active material in an anode electrode of the battery. In other words, the SEI recited herein is not the SEI that is formed after the battery cell is made and operated (e.g. not the SEI commonly formed during the electrochemical formation of the cell conducted for the first few cycles after the cell is made). The maximum lithium storage capacity $C_{max}$ refers to the maximum lithium content that can be contained in the anode active material particle (e.g., in the case of Si, 100%=$Li_{4.4}Si$, wherein there are 4.4 Li atoms in 1 Si atom).

In some embodiments, the SEI comprises a lithium- or sodium-containing species selected from $Li_2CO_3$, $Li_2C_2O_4$, LiOH, LiCl, LiI, LiBr, $ROCO_2Li$, HCOLi, ROLi, $(ROCO_2Li)_2$, $(CH_2OCO_2Li)_2$, $Li_2S$, $Li_xSO_y$, $Li_4B$, $Na_4B$, $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, a combination thereof, a combination thereof with $Li_2O$ or LiF, or a combination of $Li_2O$ and LiF, wherein X=F, Cl, I, or Br, R=a hydrocarbon group, $<x\leq1$, $1\leq y\leq4$. The determination methods of the SEI compositions are well-known in the art, including FTIR, Raman spectrometer, NMR, ESCA, elemental analysis, etc.

The anode active material may comprise a plurality of particles having SEI pre-formed on a surface of the particles or inside the interior of the particles.

Preferably, the anode active material particle is selected from the group consisting of: (a) silicon (Si), germanium (Ge), tin (Sn), lead (Pb), phosphorus (P), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, P, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium niobium oxide, lithium titanium-niobium oxide, lithium manganate, lithium aluminate, lithium-containing titanium oxide, lithium transition metal oxide, $ZnCo_2O_4$; (f) particles of graphite and carbon (not including carbon fiber or powder); and (g) combinations thereof.

The maximum lithium content in an active material may be defined as the theoretical capacity of this material. For instance, when Si is fully charged with lithium, the resulting material may be represented by a formula $Li_{4.4}Si$, which indicates a maximum charge storage capacity of 4,200 mAh/g and corresponds to a lithium weight fraction of 57.4% based on the weight of this fully lithiated Si material. Other examples include $Li_{4.4}Ge$ (maximum capacity of Ge=1,623 mAh/g), $Li_{4.4}Sn$ (maximum capacity of Sn=993 mAh/g), $Li_3Cd$ (maximum capacity of Cd=715 mAh/g), $Li_3Sb$ (maximum capacity of Sb=660 mAh/g), $Li_{4.4}Pb$ (569 mAh/g), LiZn (410 mAh/g), and $Li_3Bi$ (385 mAh/g). In certain preferred embodiments, the particle of anode active material comprises a doped semiconductor material selected from Si or Ge doped with n-type and/or p-type dopants.

In certain embodiments, the anode active material contains a lithium amount from 0.001 $C_{max}$ to 1.0 $C_{max}$ that is pre-loaded into the anode active material prior to being incorporated into an anode electrode of said battery.

The anode active material may be in a form of nano particle, nano wire, nano fiber, nano tube, nano sheet, nano belt, nano ribbon, nano disc, nano platelet, or nano horn having a thickness or diameter from 0.5 nm to 100 nm.

The anode active material particle may be coated with a layer of carbon, graphene, electron-conducting polymer, ion-conducting polymer, or a combination thereof that is disposed between the particle and the SEI. It may be noted that the SEI may not be part of the coating layer.

In certain embodiments, the anode active material particle further comprises a protecting shell, having a thickness from 0.5 nm to 5 μm (preferably from 1 nm to 2 μm and more preferably <1 μm) and a lithium ion conductivity from $10^{-8}$ S/cm to $5\times10^{-2}$ S/cm at room temperature. Such a protecting shell wraps around, embraces or encapsulates the anode active material particle.

The protecting shell may contain a polymer preferably selected from poly(ethylene oxide) (PEO), polypropylene oxide (PPO), poly(acrylonitrile) (PAN), poly(methyl methacrylate) (PMMA), poly(vinylidene fluoride) (PVdF), poly bis-methoxy ethoxyethoxide-phosphazenex, polyvinyl chloride, poly(vinylidene chloride), polydimethylsiloxane, poly (vinylidene fluoride)-hexafluoropropylene (PVDF-HFP), polyethylene glycol (PEG), a chemical derivative of PEG, poly(ethylene glycol diacrylate) (PEGDA), polyethylene glycol methyl ether, polyethylene glycol dimethyl ether, a sulfonated polymer, an interpenetrating polymer network thereof, or a combination thereof.

The interpenetrating polymer network (IPN) can include a simultaneous polymer interpenetrating network (S-IPN), a sequential IPN or semi-interpenetrating network (semi-IPN).

The sulfonated polymer may be selected from the group consisting of sulfonated polyaniline, sulfonated polypyrrole, sulfonated polythiophene, sulfonated polyfuran, a sulfonated bi-cyclic polymer, poly(perfluoro sulfonic acid), sulfonated poly (tetrafluoroethylene), sulfonated perfluoro-alkoxy derivatives of polytetrafluoroethylene, sulfonated polysulfone, sulfonated poly(ether ketone), sulfonated poly (ether ether ketone), sulfonated polyimide, sulfonated styrene-butadiene copolymers, sulfonated polystyrene, sulfonated poly chloro-trifluoroethylene (PCTFE), sulfonated perfluoroethylene-propylene copolymer (FEP), sulfonated ethylene-chlorotrifluoroethylene copolymer (ECTFE), sulfonated poly vinylidenefluoride (PVDF), sulfonated copolymers of polyvinylidenefluoride with hexafluoropropene and tetrafluoroethylene, sulfonated copolymers of ethylene and tetrafluoroethylene (ETFE), sulfonated polybenzimidazole (PBI), their chemical derivatives, copolymers, blends, and combinations thereof.

It may be noted that the SEI may not be part of the protecting layer. However, in some embodiments, the protecting shell may be made to further comprise a lithium- or sodium-containing species dispersed therein and the lithium- or sodium-containing species is selected from $Li_2CO_3$, $Li_2C_2O_4$, LiOH, LiCl, LiI, LiBr, $ROCO_2Li$, HCOLi, ROLi, $(ROCO_2Li)_2$, $(CH_2OCO_2Li)_2$, $Li_2S$, $Li_xSO_y$, $Li_4B$, $Na_4B$, $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, a combination thereof, a combination thereof with $Li_2O$ or LiF, or a combination of $Li_2O$ and LiF, wherein X=F, Cl, I, or Br, R=a hydrocarbon group, $<x \leq 1$, $1 \leq y \leq 4$. These species may be added into the protecting layer.

In some embodiments, the protecting shell further comprises a lithium salt selected from lithium carbonate, $Li_2CO_3$, lithium hydroxide, LiOH, lithium halogenide (LiF, LiCl, LiI, or LiBr), lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoro-ethylsulfonylimide (LiBETI), lithium bis(trifluoromethanesulphonyl trifluoromethanesulfonyl)imide, lithium bis(fluorosulphonyl fluorosulfonyl)imide, lithium trifluoromethanesulfonimide (LiTFSI), an ionic liquid-based lithium salt, and combinations thereof.

The present disclosure also provides a mass of anode active material powder comprising multiple particulates of the afore-mentioned anode active material having pre-formed SEI (with or without a protecting shell). The disclosure also provides an anode electrode comprising the afore-mentioned anode active material, an optional conductive additive, and an optional binder. Also provided is a lithium-ion or lithium metal battery containing such an anode electrode, a cathode electrode, and an electrolyte in ionic contact with the anode electrode and the cathode electrode.

In certain preferred embodiments, inside the protecting shell, the particles is coated with a layer of carbon, graphene, electron-conducting polymer, ion-conducting polymer, or a combination thereof that is disposed between the anode active material particles and the protecting polymer layer. Such a layer of carbon, graphene, electron-conducting polymer, ion-conducting polymer, or a combination thereof may be coated on surfaces of the protecting polymer layer.

Also provided is a particulate that comprises a core and an encapsulating shell protecting the core, wherein the core comprises multiple anode active material particles wherein at least one of the multiple anode active material particles comprises pre-formed SEI. Preferably, most or all of these multiple particles are anode active material particles having pre-formed SEI described above.

The present disclosure also provides a method of producing multiple anode active material particles described in the foregoing. In certain embodiments, the method comprises: (a) providing a plurality of particles of an anode active material; (b) lithiating (e.g. electrochemically introducing an amount of lithium ions into) the particles to form prelithiated particles that each contains solid-electrolyte interface (SEI) on a surface or in an internal structure of the particles, wherein the amount of lithium is from 1% to 100% of $C_{max}$, the maximum lithium content that can be contained in the anode active material; (c) partially or fully de-lithiating the prelithiated particles by removing a desired amount of lithium from the prelithiated particles; and (d) at least repeating step (b).

In some preferred embodiments, the pre-formed SEI comprises a lithium- or sodium-containing species selected from $Li_2CO_3$, $Li_2C_2O_4$, LiOH, LiCl, LiI, LiBr, $ROCO_2Li$, HCOLi, ROLi, $(ROCO_2Li)_2$, $(CH_2OCO_2Li)_2$, $Li_2S$, $Li_xSO_y$, $Li_4B$, $Na_4B$, $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, a combination thereof, a combination thereof with $Li_2O$ or LiF, or a combination of $Li_2O$ and LiF, wherein X=F, Cl, I, or Br, R=a hydrocarbon group, $<x \leq 1$, $1 \leq y \leq 4$.

In some embodiments, the method further comprises repeating step (c) after step (d) is conducted (i.e. after repeating step (b)). In some embodiments, the method further comprises repeating step (b) n times and repeating step (c) either (n−1) times or n times wherein n=2-10.

The method may further comprise a step of depositing a protecting polymer layer to embrace at least one of the lithiated/delithiated particles, wherein the protecting polymer layer has a thickness from 0.5 nm to 5 μm, and a lithium ion conductivity from $10^{-8}$ S/cm to $5 \times 10^{-2}$ S/cm at room temperature.

In certain preferred embodiments, the step of lithiating or de-lithiating may be conducted electrochemically. However, alternatively, chemical lithiation or physical lithiation may be conducted.

In certain preferred embodiments, step (b) comprises electrochemically introducing an amount of lithium ions into the particles by operating an electrochemical reactor apparatus wherein the apparatus comprises (i) a working electrode containing the anode active material particles; (ii) a counter-electrode containing a lithium source (e.g. a piece of lithium foil or a lithium rod) or sodium source (e.g. a piece of sodium foil or a sodium rod); (iii) a liquid electrolyte in ionic contact with the working electrode and the counter-electrode, said electrolyte containing a lithium salt or sodium salt or a combination thereof dissolved in a liquid solvent; and (iv) a power source that imposes an electric current or voltage between the working electrode and the counter-electrode.

The lithium salt may be selected from lithium carbonate, $Li_2CO_3$, lithium hydroxide, LiOH, lithium halogenide (LiF, LiCl, LiI, or LiBr), lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroalkyl-phosphates (LiPF$_3$(CF$_2$CF$_3$)$_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, and combinations thereof.

The sodium salt may be selected from sodium carbonate, Na$_2$CO$_3$, sodium hydroxide, NaOH, sodium halogenide (NaF, NaCl, NaI, or NaBr), sodium perchlorate, NaClO$_4$, sodium hexafluorophosphate, NaPF$_6$, sodium borofluoride, NaBF$_4$, sodium hexafluoroarsenide, NaAsF$_6$, sodium trifluoro-methanesulfonate, NaCF$_3$SO$_3$, bis-trifluoromethyl sulfonylimide sodium, NaN(CF$_3$SO$_2$)$_2$, sodium bis(oxalato)borate, NaBOB, sodium oxalyldifluoroborate, NaBF$_2$C$_2$O$_4$, sodium oxalyldifluoroborate, NaBF$_2$C$_2$O$_4$, sodium nitrate, NaNO$_3$, Na-Fluoroalkyl-Phosphates, NaPF$_3$(CF$_2$CF$_3$)$_3$, sodium bisperfluoro-ethylsulfonylimide, NaBETI, sodium bis(trifluoromethanesulphonyl)imide, sodium bis(fluorosulphonyl)imide, sodium trifluoromethanesulfonimide, NaTFSI, an ionic liquid-based sodium salt, or a combination thereof.

The liquid solvent used in the electrolyte contained in the electrochemical reactor apparatus can be water, any organic solvent, inorganic liquid, or ionic liquid. The solvent is preferably selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

The method may further comprise a step of depositing a protecting polymer layer to embrace at least one of the repeated lithiation/delithiation-treated particles, wherein the protecting polymer layer has a thickness from 0.5 nm to 5 μm, and a lithium ion conductivity from $10^{-8}$ S/cm to $5\times10^{-2}$ S/cm at room temperature.

The protecting polymer layer preferably contains a polymer selected from poly(ethylene oxide) (PEO), polypropylene oxide (PPO), poly(acrylonitrile) (PAN), poly(methyl methacrylate) (PMMA), poly(vinylidene fluoride) (PVdF), poly bis-methoxy ethoxyethoxide-phosphazenex, polyvinyl chloride, poly(vinylidene chloride), polydimethylsiloxane, poly(vinylidene fluoride)-hexafluoropropylene (PVDF-HFP), polyethylene glycol, polyethylene glycol methyl ether, polyethylene glycol dimethyl ether, a sulfonated polymer, or a combination thereof.

The sulfonated polymer may be selected from the group consisting of sulfonated polyaniline, sulfonated polypyrrole, sulfonated polythiophene, sulfonated polyfuran, a sulfonated bi-cyclic polymer, poly(perfluoro sulfonic acid), sulfonated poly (tetrafluoroethylene), sulfonated perfluoroalkoxy derivatives of polytetrafluoroethylene, sulfonated polysulfone, sulfonated poly(ether ketone), sulfonated poly (ether ether ketone), sulfonated polyimide, sulfonated styrene-butadiene copolymers, sulfonated polystyrene, sulfonated poly chloro-trifluoroethylene (PCTFE), sulfonated perfluoroethylene-propylene copolymer (FEP), sulfonated ethylene-chlorotrifluoroethylene copolymer (ECTFE), sulfonated poly vinylidenefluoride (PVDF), sulfonated copolymers of polyvinylidenefluoride with hexafluoropropene and tetrafluoroethylene, sulfonated copolymers of ethylene and tetrafluoroethylene (ETFE), sulfonated polybenzimidazole (PBI), their chemical derivatives, copolymers, blends, and combinations thereof.

The protecting polymer layer may further comprise a lithium- or sodium-containing species dispersed therein and wherein said lithium- or sodium-containing species is selected from Li$_2$CO$_3$, Li$_2$O, Li$_2$C$_2$O$_4$, LiOH, LiX, ROCO$_2$Li, HCOLi, ROLi, (ROCO$_2$Li)$_2$, (CH$_2$OCO$_2$Li)$_2$, Li$_2$S, Li$_x$SO$_y$, Li$_4$B, Na$_4$B, Na$_2$CO$_3$, Na$_2$O, Na$_2$C$_2$O$_4$, NaOH, NaX, ROCO$_2$Na, HCONa, RONa, (ROCO$_2$Na)$_2$, (CH$_2$OCO$_2$Na)$_2$, Na$_2$S, Na$_x$SO$_y$, or a combination thereof, wherein X=F, Cl, I, or Br, R=a hydrocarbon group, $0<x\le1$, $1\le y\le4$.

In certain embodiments, the protecting polymer layer further comprises a lithium salt selected from lithium carbonate, Li$_2$CO$_3$, lithium hydroxide, LiOH, lithium halogenide (LiF, LiCl, LiI, or LiBr), lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroalkyl-phosphates (LiPF$_3$(CF$_2$CF$_3$)$_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, and combinations thereof.

In certain embodiments, the step of depositing a protecting polymer layer includes a procedure selected from pan-coating, air-suspension coating, centrifugal extrusion, vibration nozzle, spray-drying, oven or furnace drying, ionotropic gelation, coacervation-phase separation, interfacial polycondensation, interfacial cross-linking, in-situ polymerization, or matrix polymerization.

In the invented method, the anode active material particles are preferably selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium niobium oxide, lithium titanium-niobium oxide, lithium manganate, lithium aluminate, lithium-containing titanium oxide, lithium transition metal oxide, ZnCo$_2$O$_4$; (f) particles of graphite and carbon (not including carbon fibers or carbon powder); and (g) combinations thereof.

The step of lithiating may include electrochemical lithiation, chemical lithiation, physical lithiation, or a combination thereof. Preferably, the anode active material comprises silicon and the prelithiated particles comprise a prelithiated silicon represented by Li$_4$Si, Li$_{4.4}$Si, or Li$_x$Si, wherein numerical x is from 1 to 4.4. These lithiated particles may be subjected to delithiation, and subsequently repeated lithiation/delithiation procedures.

The particles of an anode active material may comprise a doped semiconductor material selected from Si or Ge doped with n-type and/or p-type dopants.

The method may further comprise a step of coating a surface of repeatedly lithiated/delithiated particles with a thin layer of carbon, graphene, or electron-conducting polymer, having a thickness from 0.5 nm to 1 µm, prior to step (b) or step (c). The thin layer of carbon is obtained from pyrolization of a polymer, pitch, or organic precursor or obtained by chemical vapor deposition, physical vapor deposition, or sputtering.

The disclosure also provides a method of producing a lithium-ion battery comprising (A) preparing an anode from the prelithiated anode particles produced by the aforementioned method; and (B) combining the anode with a cathode, and an electrolyte to form the battery.

DETAILED DESCRIPTION OF PREFERRED EMBODIMENTS

Figure 1A:
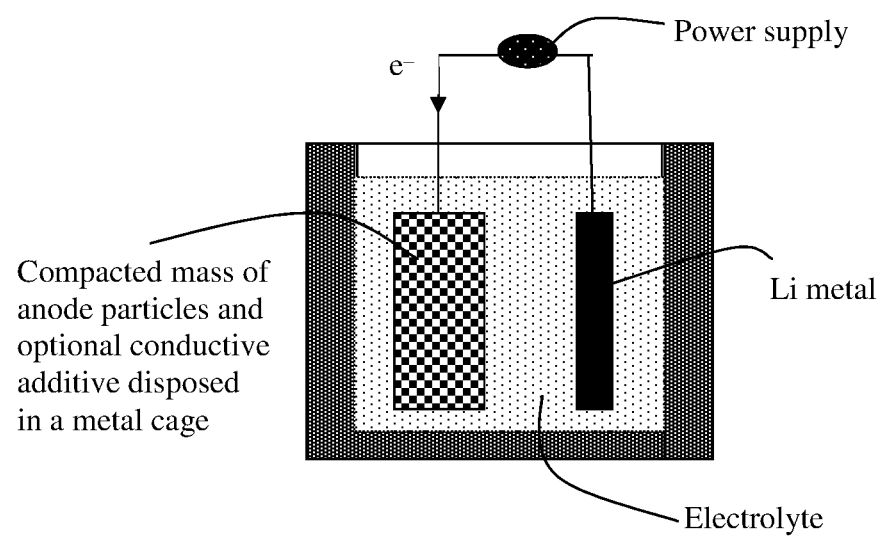
FIG. 1(A) Schematic of an electrochemical apparatus or reactor for repeatedly lithiating and then de-lithiating particles of an anode active material to produce SEI substances outside an intended lithium-ion battery (prior to being incorporated as an anode active material of the intended battery), according to a preferred embodiment of the present disclosure.

This disclosure is related to anode materials for high-capacity lithium-ion batteries, which are preferably secondary batteries based on a non-aqueous electrolyte, a polymer gel electrolyte, polymer electrolyte, quasi-solid electrolyte, or solid-state electrolyte. The shape of a lithium ion battery can be cylindrical, square, button-like, etc. The present disclosure is not limited to any battery shape or configuration.

In certain embodiments, the disclosed anode active material is capable of reversibly storing lithium ions therein up to a maximum lithium storage capacity $C_{max}$ during a charge or discharge of the battery and the anode active material comprises an amount of solid-electrolyte interphase (SEI) on a surface on or inside the anode active material, wherein the SEI is pre-formed prior to incorporating the anode active material in an anode electrode of the battery. The SEI recited herein is not the SEI that is formed after the battery cell is made and operated (e.g. not the SEI commonly formed during the electrochemical formation of the cell conducted during the first few cycles after the cell is made). The maximum lithium storage capacity $C_{max}$ refers to the maximum lithium content that can be contained in the anode active material particle (e.g., in the case of Si, 100%=$Li_{4.4}Si$, wherein there are 4.4 Li atoms in 1 Si atom).

In some embodiments, the SEI comprises a lithium- or sodium-containing species selected from $Li_2CO_3$, $Li_2C_2O_4$, LiOH, LiCl, LiI, LiBr, $ROCO_2Li$, HCOLi, ROLi, $(ROCO_2Li)_2$, $(CH_2OCO_2Li)_2$, $Li_2S$, $Li_xSO_y$, $Li_4B$, $Na_4B$, $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, a combination thereof, a combination thereof with $Li_2O$ or LiF, or a combination of $Li_2O$ and LiF, wherein X=F, Cl, I, or Br, R=a hydrocarbon group, $<x \leq 1$, $1 \leq y \leq 4$. These species may be formed on the surface of an anode active material particle if/when the anode active material particle (in the presence of a liquid electrolyte containing a lithium salt or sodium salt dissolved in a liquid solvent) is brought to be at an electrochemical potential lower than a threshold potential for reductive decomposition of the liquid electrolyte (e.g. typically when the anode is at a potential lower than 1.5 V with respect to $Li/Li^+$ or lower than 1.2 V with respect to $Na/Na^+$). Reductive decomposition product species may react with pre-existing chemical species or elements of an anode active material to form solid-electrolyte interface (SEI) substances. These pre-existing species or elements may be on the particle surface or in the interior or internal structure of the anode material.

The anode active material may comprise a plurality of particles having SEI pre-formed on a surface of the particles or inside the interior of the particles.

It may be noted that the SEI-forming procedures also allow the lithium ions to enter the internal structure of an anode active material and some of the lithium ions can get trapped in certain defect sites or somehow get captured by some chemical species present. The SEI-forming treatments presently disclosed appear to be capable of removing or nullifying such negative effects on battery capacity degradation.

In certain embodiments, the pre-lithiated/delithiated anode active material particle further comprises a protecting shell, having a thickness from 0.5 nm to 5 µm (preferably from 1 nm to 2 µm and more preferably <1 µm) and a lithium ion conductivity from $10^{-8}$ S/cm to $5 \times 10^{-2}$ S/cm at room temperature. Such a protecting shell wraps around, embraces or encapsulates the anode active material particle.

The protecting shell may contain a polymer preferably selected from poly(ethylene oxide) (PEO), polypropylene oxide (PPO), poly(acrylonitrile) (PAN), poly(methyl methacrylate) (PMMA), poly(vinylidene fluoride) (PVdF), poly bis-methoxy ethoxyethoxide-phosphazenex, polyvinyl chloride, poly(vinylidene chloride), polydimethylsiloxane, poly (vinylidene fluoride)-hexafluoropropylene (PVDF-HFP), polyethylene glycol, polyethylene glycol methyl ether, polyethylene glycol dimethyl ether, an interpenetrating polymer network thereof, a sulfonated polymer, or a combination thereof.

In certain other preferred embodiments, the anode active material particles are coated with a layer of carbon, graphene, electron-conducting polymer, or a combination thereof to form conductive material-coated particles prior to being embraced by the protecting polymer layer.

The sulfonated polymer is preferably selected from the group consisting of sulfonated polyaniline, sulfonated polypyrrole, sulfonated polythiophene, sulfonated polyfuran, a sulfonated bi-cyclic polymer, poly(perfluoro sulfonic acid), sulfonated poly (tetrafluoroethylene), sulfonated perfluoroalkoxy derivatives of polytetrafluoroethylene, sulfonated polysulfone, sulfonated poly(ether ketone), sulfonated poly (ether ether ketone), sulfonated polyimide, sulfonated styrene-butadiene copolymers, sulfonated polystyrene, sulfonated poly chloro-trifluoroethylene (PCTFE), sulfonated perfluoroethylene-propylene copolymer (FEP), sulfonated ethylene-chlorotrifluoroethylene copolymer (ECTFE), sulfonated poly vinylidene fluoride (PVDF), sulfonated copolymers of polyvinylidene fluoride with hexafluoropropene and tetrafluoroethylene, sulfonated copolymers of ethylene and tetrafluoroethylene (ETFE), sulfonated polybenzimidazole (PBI), their chemical derivatives, copolymers, blends, and combinations thereof.

An interpenetrating polymer networks (IPN) consists of two or more chemically different networks, which are at least partially interlaced on a polymer scale but, in theory, are not covalently bonded to each other, although in practice some type of grafting between the networks can occur. One can also define: (i) semi-interpenetrating polymer networks (semi-IPN, containing networks and linear or branched polymer(s) that can be separated) and (ii) sequential semi-interpenetrating polymer networks. IPNs and semi-IPNs can be formed simultaneously or sequentially.

IPNs are synthesized from a blend of two multifunctional monomers that polymerize through two different routes (e.g., radical and cationic). This usually occurs according to a thermal process. However, photopolymerization techniques also can be used to produce IPNs. A photoinitiating system (PIS) containing at least one or two photoinitiators PI may be used to start the polymerization reactions.

Semi-interpenetrating polymer networks have also been obtained by UV curing of, e.g., acrylate monomers dispersed in a polymer matrix (polyurethane, polyvinyl chloride, polymethyl methacrylate, polybutadiene, polyisoprene), hyaluronic acid/hydroxyethyl methacrylate derivatized dextran (usable in 3D hydrogel bioprinted constructs). IPNs from acrylate/epoxidised polyisoprene blends have been reported.

IPNs have been prepared, e.g., from a trifunctional thiol/poly (ethylene glycol) (PEG)-diallyl blend via a thiol-ene coupling reaction. A mixture of poly (ethylene glycol) diacrylate (PEGDA) and hexanediol diacrylate (HDDA) monomers polymerized within a hexagonal liquid crystalline template may form an IPN-type material.

The protecting shell may contain a polymer comprising a lithium salt dispersed therein (i.e. dispersed in the protecting polymer layer) wherein the lithium salt is selected from lithium carbonate, $Li_2CO_3$, lithium hydroxide, LiOH, lithium halogenide (LiF, LiCl, LiI, or LiBr), lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoroethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, and combinations thereof.

In certain embodiments, the protecting polymer layer may comprise a lithium- or sodium-containing species dispersed therein (i.e. dispersed in the protecting polymer layer) wherein the lithium- or sodium-containing species is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, $Li_4B$, $Na_4B$, $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, or a combination thereof, wherein X=F, Cl, I, or Br, R=a hydrocarbon group, $0 < x \leq 1$, $1 \leq y \leq 4$. The lithium- or sodium-containing species may be preferably derived from an electrochemical decomposition reaction.

For a lithium ion battery, according to a preferred embodiment of the present disclosure, the starting anode active material (in a fine powder form) may be selected from the group consisting of: (a) silicon (Si), germanium (Ge), tin (Sn), lead (Pb), phosphorus (P), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, P, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) particles of graphite and carbon; and (g) combinations thereof.

Prelithiation herein refers to introduction of lithium into anode active material prior to incorporation of the anode active material into a Li-ion cell under electrochemical conditions conducive to SEI formation (e.g. at a voltage below 1.5 V with respect to Li/Li$^+$). Prelithiation or, simply, lithiation, can be accomplished in several different ways that are classified into 3 categories: physical methods, electrochemical methods, and chemical methods. The chemical methods are typically conducted by sourcing lithium atoms from active reactants or lithium metal. The active reactants can include organometallic compounds and lithium salts and the reactions can be effectuated ex-situ (in a chemical reactor before anode fabrication, or after anode fabrication but before cell assembly). One may also bring lithium metal in direct contact with particles of the desired anode active material in a dry condition or with the presence of a liquid electrolyte.

A physical process entails depositing a Li coating on a surface of an anode active material substrate (e.g., a layer of fine Si particles), followed by promoting thermally induced diffusion of Li into the substrate (e.g., into the interior of a Si particles). A thin lithium layer can be deposited on the surface of an anode material substrate using a standard thin film process, such as thermal evaporation, electron beam evaporation, sputtering, and laser ablation. A vacuum is used during the deposition process to avoid reactivity between the atomic lithium and molecules of lithium-reactive substances such as water, oxygen, and nitrogen. A vacuum of greater than 1 milli-Torr is desirable. When electron beam deposition is used a vacuum of $10^{-4}$ Torr is desired and a vacuum of $10^{-6}$ Torr is preferred to avoid interaction between the electron beam and any residual air molecules.

The evaporative deposition techniques involve the heating of a lithium metal to create a lithium vapor. The lithium metal can be heated by an electron beam or by resistive heating of the lithium metal. The lithium vapor deposits lithium onto a substrate composed of packed Si particles. To promote the deposition of lithium metal the substrate can be cooled or maintained at a temperature lower than the temperature of the lithium vapor. A thickness monitor such as a quartz crystal type monitor can be placed near the substrate to monitor the thickness of the film being deposited. Alternatively, laser ablation and sputtering techniques can be used to deposit thin lithium film on a substrate. For example, argon ions can be used in the sputtering process to bombard a solid lithium metal target. The bombarding knocks lithium off of the target and deposits it on the surface of a substrate. Laser ablation processes can be used to knock lithium off of a lithium target. The separated lithium atoms are then deposited onto the substrate. The lithium-coated layer of packed Si particles (as an example of an anode active material) is then immersed into a liquid electrolyte containing a lithium salt dissolved in an organic solvent. Lithium atoms rapidly permeate into the bulk of Si particles to form prelithiated Si particles. Physical methods may also be conducted by simply mixing molten lithium metal with particles of the anode active materials (e.g. Si, Ge, SiO, $CO_3O_4$, Sn, $SnO_2$, $ZnCo_2O_4$, etc.).

A more preferred pre-lithiation process involves electrochemically forcing Li atoms to migrate into the bulk of multiple Si or graphite particles under the influence of an electromotive force (emf); for instance, by imposing current/voltage onto a working electrode and a counter-electrode.

In a typical arrangement (as schematically illustrated in FIG. 1(A)), again using Si as an example of an anode active material in an intended Li-ion cell, a compacted mass of Si (having carbon particles as a conductive additive mixed with these Si particles or having individual Si particles coated with a carbon material or embraced with graphene sheets) encased in a porous metal mess cage is used as a working electrode (a positive electrode herein in the reactor) and Li metal sheet or rod as a counter-electrode (a negative electrode) in the electrochemical reactor. The two electrodes are then immersed in a liquid electrolyte containing a lithium salt (or sodium salt) dissolved in an organic solvent. An electric current is then applied between the anode and the cathode. This is similar to an electro-plating procedure, but, surprisingly, Li atoms are capable of permeating into the bulk of the Si or graphite particles. For electro-chemical lithiation of Si or graphite particles, the particles may be confined in a porous container (e.g., fine metal mesh cage) that is permeable to electrolyte, but does not allow solid Si or graphite particles to escape. The fine metal mesh cage and the anode active material confined therein serve as a working electrode while a lithium metal rod or sheet serves as a counter electrode. The entire set-up is preferably immersed in a liquid electrolyte contained in an electrochemical reactor.

The formation of SEI species on the surface or in the internal structure of an intended anode active material may be accomplished in an electrochemical reactor, which is an apparatus very similar to an electrode plating system (e.g. FIG. 1(A)). In this reactor, a pack of anode active material particles is used as a working electrode and lithium sheet (or sodium sheet) as a counter electrode. Contained in the reactor is an electrolyte composed of a lithium or sodium salt dissolved in a solvent (e.g. 1M $LiPF_6$ dissolved in a mixture of ethylene carbonate (EC) and dimethyl carbonate (DMC) at a 1:1 ratio by volume). A current is then imposed between these two electrodes (lithium or sodium sheet-based counter-electrode and the working electrode). The anode active material particles in the working electrode are galvanostatically discharged (e.g. Li ions being sent to and captured by surfaces/edges or internal structure of the anode active material) and charged (Li ions released by the anode active material particles) in the voltage range from 0.01V to 4.9V at the current densities of typically 100-1000 mA/g following a voltage-current program similar to what would be used in a lithium-ion battery. However, the system is intentionally subjected to conditions conducive to reductive degradation of electrolyte (e.g. close to 0.01-1.5 V vs. Li/Li$^+$) or oxidative degradation of electrolyte (4.1-4.9 V vs. Li/Li$^+$) for a sufficient length of time. The degradation products react with Li$^+$ ions, Li salt, functional groups (if any) or carbon atoms on anode active material edges/planes to form the lithium-containing species that also can chemically bond, bridge, or cross-link the otherwise separate anode particles together.

The chemical compositions of the lithium-containing species are governed by the voltage range, the number of cycles (from 0.01 V to 4.9 V, and back), solvent type, lithium salt type, chemical composition of anode active materials (e.g. % of O, H, C, and N), and electrolyte additives (e.g. $LiNO_3$, if available). The morphology, structure and composition of lithium-containing species that are bonded to anode active materials can be characterized by scanning electron microscope (SEM), transmission electron microscope (TEM), Raman spectrum, X-ray diffraction (XRD), Fourier Transform Infrared Spectroscopy (FTIR), elemental analysis, and X-ray photoelectron spectroscopy (XPS).

Figure 1B:
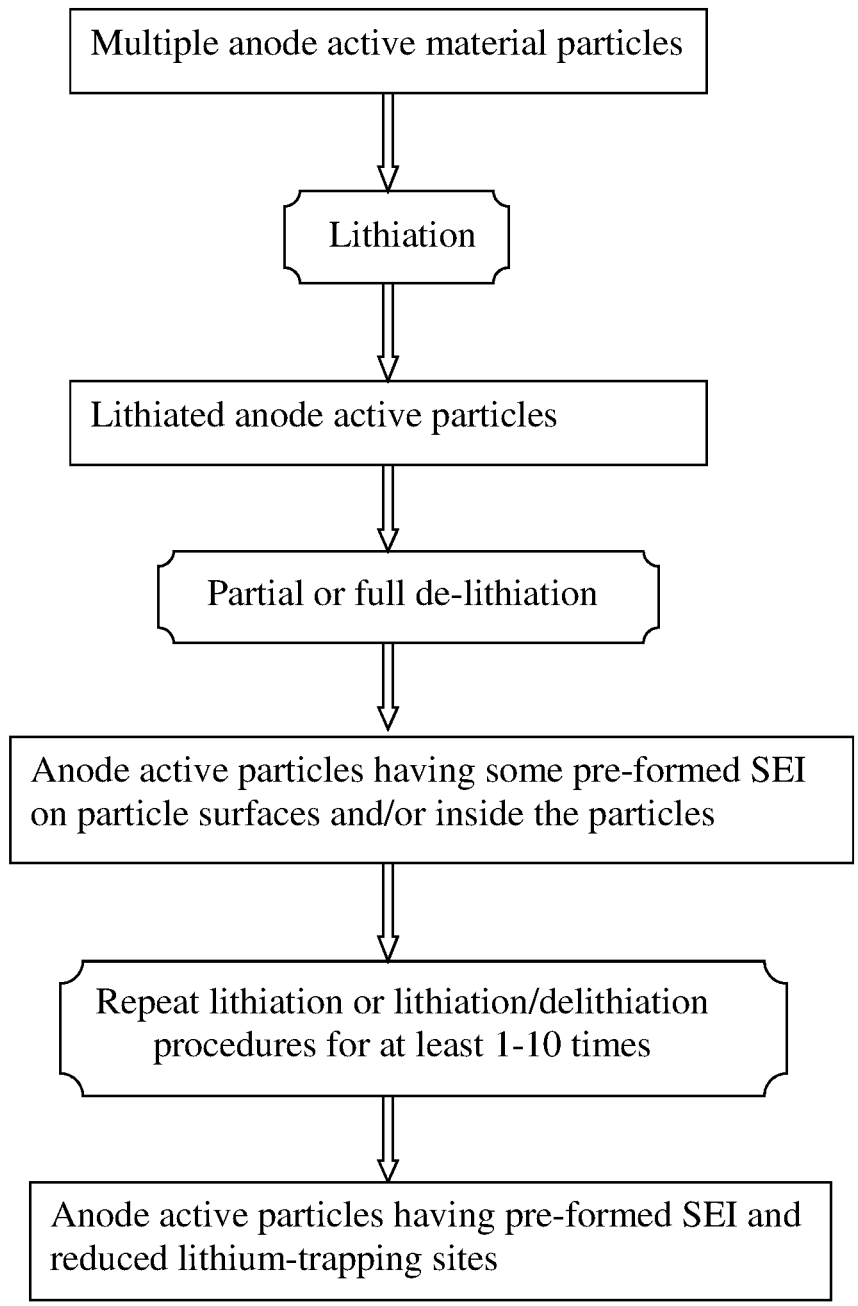
FIG. 1(B) Schematic of an electrochemical process for repeatedly lithiating and de-lithiating particles of an anode active material to produce pre-formed SEI, according to a preferred embodiment of the present disclosure.
Figure 1C:
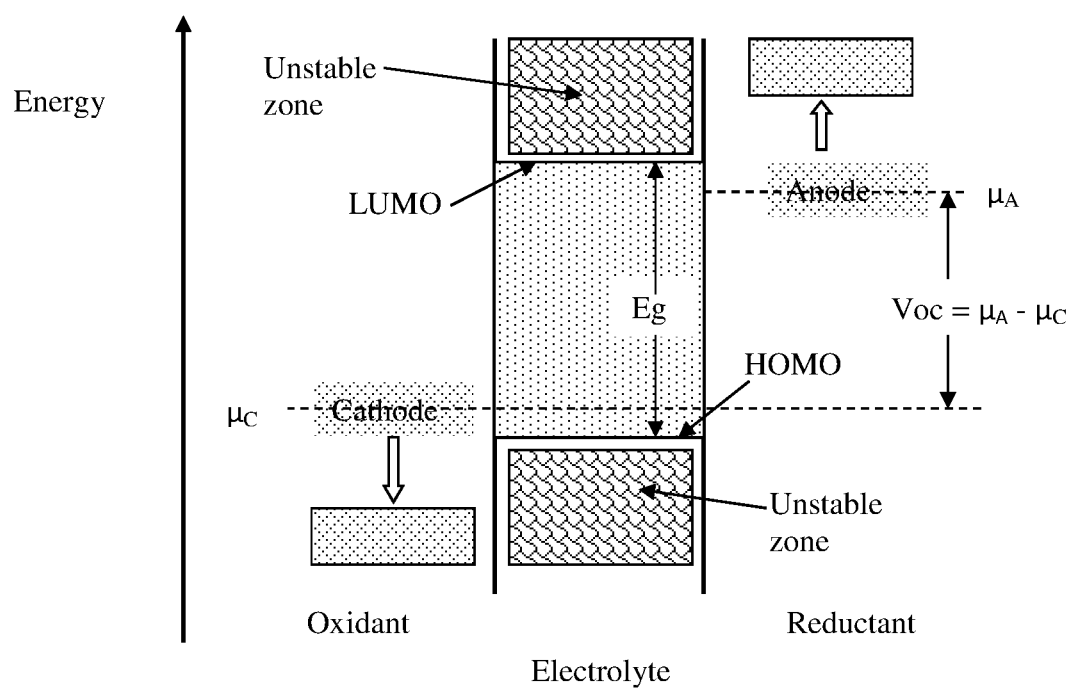
FIG. 1(C) An energy diagram to illustrate electrochemical potential or energetic conditions under which electrolyte in an electrochemical reactor undergoes oxidative or reductive degradation at the electrode-electrolyte boundary.

The decomposition of non-aqueous electrolyte leads to the formation of lithium or sodium chemical compounds as the SEI bonded to surfaces and edges or internal structure (if accessible to the electrolyte) of the anode active material. The reasons why the non-aqueous electrolyte decomposed during discharge-charge cycling in an electrochemical reactor may be explained as follows. As illustrated in FIG. 1(C), in an electrochemical reactor system where there are a cathode and an anode (i.e. a working electrode and a counter-electrode) in contact with an electrolyte, the thermodynamic stability of the electrolyte is dictated by the relative electron energies of the two electrodes relative to the energy level of the non-aqueous electrolyte. The anode is potentially a reductant, and the cathode an oxidant. The two electrodes are typically electronic conductors and, in this diagram, their electrochemical potential are designated as $\mu_A$ and $\mu_C$ (or Fermi energies $\varepsilon_F$), respectively. The energy separation, $E_g$, between the lowest unoccupied molecular orbital (LUMO) and the highest occupied molecular orbital (HOMO) of the electrolyte is the stable electrochemical window of the electrolyte. In other words, in order for the electrolyte to remain thermodynamically stable (i.e. not to decompose), the electrochemical potential of the anode ($\mu_A$) must be maintained below the LUMO and $\mu_C$ of the cathode must be above the HOMO.

From the schematic diagram of FIG. 1(C), we can see that an anode with $\mu_A$ above the LUMO and a cathode with $\mu_C$ below the HOMO will reduce and oxidize the electrolyte, respectively, unless a passivating film is formed that creates a barrier to electron transfer between the anode and electrolyte or between the cathode and the electrolyte. In the presently invented method, an external current/voltage is intentionally applied over the anode and the cathode to bias their respective electrochemical potential levels so that the electrolyte can go outside of the stable electrochemical potential window, undergoing oxidative and/or reductive degradation. The degradation products are reactive species that react among themselves and with the functional groups or active atoms of an anode active material, forming a mass of lithium- or sodium-containing species that are bonded to the anode active material particle.

For the list of lithium/sodium salts and solvents investigated, the electrolytes have an oxidation potential (HOMO) at about 4.7 V and a reduction potential (LUMO) near 1.0-1.5 V. (All voltages in this specification are with respect to $Li^+/Li$ or $Na^+/Na$). As an example, we have observed that the chemical interaction of $Li^+$ or $Na^+$ ions with Si occur at about 0.03-07 V, so electrolytes are prone to reductive degradation in the voltage range of 0.03-0.7 V. By imposing a voltage close to 4.7 volts, the electrolytes are also subject to oxidative degradation. The degradation products spontaneously react with chemical species associated with an anode active material particle (porous or non-porous), forming a SEI phase that bonds to the anode active material during the charge-discharge cycling (electrolyte reduction-oxidation cycling). In general, these lithium- or sodium-containing species are not electrically conducting and, hence, these reactions can self-terminate to form essentially a passivating phase.

The electrolytes that can be used in this electrochemical decomposition reactor may be selected from any lithium or sodium metal salt that is dissolvable in a solvent to produce an electrolyte. Preferably, the metal salt is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bis-perfluoro-ethylsulfonylimide (LiBETI), lithium bis(trifluoromethanesulphonyl)imide, lithium bis(fluorosulphonyl)imide, lithium trifluoromethanesulfonimide (LiTFSI), sodium perchlorate ($NaClO_4$), sodium hexafluorophosphate ($NaPF_6$), sodium borofluoride ($NaBF_4$), sodium trifluoro-methanesulfonate ($NaCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide sodium ($NaN(CF_3SO_2)_2$), or a combination thereof. It may be noted that these metal salts are also commonly used in the electrolytes of rechargeable lithium or sodium batteries.

The electrolytes used in this electrochemical reactor may preferably contain a solvent selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof. These solvents are also commonly used in the electrolytes of rechargeable lithium or sodium batteries.

It may be noted that these lithium salts or sodium salts and related solvents are also commonly used in corresponding Li-ion or Na-ion cells.

After the anode active material particles (e.g. Si or graphite) are pre-lithiated to a desired extent (e.g. up to the full lithium storage capacity of Si or graphite), the electric current can be reversed in polarity (e.g. instead of pumping electrons into the Si/graphite electrode, electrons are drawn out of the Si/graphite electrode). This is analogous to de-plating or de-intercalation of lithium from the Si/graphite electrode. This process is summarized in FIG. 1(B) according to some embodiments of the presently disclosed method. Such a procedure is conducted to remove lithium from the anode active material particle (Si or graphite particle) to increase the electrochemical potential to induce reductive decomposition of the electrolyte in the reactor, if so desired. De-lithiation or combined lithiation/de-lithiation may be repeated one time or as many times as desired (typically from 1 to 10 times).

The aforementioned prelithiation processes (repeated lithiation/de-lithiation procedures) are applicable to all of the anode active materials discussed in the present specification, not just Si and graphite, although Si and graphite are used as an example to illustrate the best-mode practice. The anode active material preferably comprises silicon and the prelithiated particles comprise a prelithiated silicon, represented by $Li_4Si$, $Li_{4.4}Si$, or $Li_xSi$, wherein numerical x is between 1 and 4.4. The step of providing an anode active material may comprise providing a doped semiconductor material. Such a doped semiconductor material may be selected from Si or Ge doped with n-type and/or p-type dopants. Commonly used n-type dopants are P, As, and Sb and commonly used p-type dopants are Al, Ga, and In.

The prelithiated anode active material particles are then subjected to a deposition treatment that forms a protecting polymer layer to embrace the prelithiated particles. The same deposition treatment also applies to un-prelithiated particles and those particles that have been coated with a thin layer (0.5 nm to 2 μm in thickness) of carbon, graphene, electron-conducting polymer, etc.).

The protective polymer layer described in this disclosure typically exhibits a lithium ion or sodium ion conductivity from $1.0 \times 10^{-8}$ S/cm to $5.0 \times 10^{-2}$ S/cm, more typically from $1 \times 10^{-7}$ S/cm to $5 \times 10^{-3}$ S/cm, and further more typically $>10^{-5}$ S/cm, and most typically and preferably $>10^{-4}$ S/cm. The protecting polymer may be cast into a thin film to allow for ion conductivity measurement.

Several micro-encapsulation processes can be used to partially or fully embrace or encapsulate particles of an anode active material (with or without prelithiation) with a protective polymer layer. It may be noted that the feature of having surfaces being substantially lithium-free makes it safer and more convenient to carry out these micro-encapsulation processes. Liquid-based micro-encapsulation processes typically require dissolution of a polymer (or its precursor) (and, optionally, a lithium salt, a sodium salt, multiple lithium salts, and/or multiple sodium salts) in a solvent (including mixture of multiple solvents) to form a solution. This solution can then be used to encapsulate solid particles via several of the micro-encapsulation methods to be discussed in what follows.

There are three broad categories of micro-encapsulation methods that can be implemented to produce encapsulated particles of an anode active material: physical methods, physico-chemical methods, and chemical methods. The physical methods include pan-coating, air-suspension coating, centrifugal extrusion, vibration nozzle, and spray-drying methods. The physico-chemical methods include ionotropic gelation and coacervation-phase separation methods. The chemical methods include interfacial polycondensation or other surface reactions. Several methods are discussed below as examples.

Pan-Coating Method:

The pan coating process involves tumbling the active material particles in a pan or a similar device while the encapsulating material (e.g. highly concentrated solution of Li/Na salts in a solvent) is applied slowly until a desired encapsulating shell thickness is attained.

Air-Suspension Coating Method:

In the air suspension coating process, the solid particles (core material) are dispersed into the supporting air stream in an encapsulating chamber. A controlled stream of a salt-solvent solution (with an optional polymer) is concurrently introduced into this chamber, allowing the solution to hit and coat the suspended particles. These suspended particles are encapsulated (fully coated) with the salts while the volatile solvent is removed, leaving a very thin layer of Li and/or Na salts on surfaces of these particles. This process may be repeated several times until the required parameters, such as full-coating thickness (i.e. encapsulating shell or wall thickness), are achieved. The air stream which supports the particles also helps to dry them, and the rate of drying is directly proportional to the temperature of the air stream, which can be adjusted for optimized shell thickness.

In a preferred mode, the particles in the encapsulating zone portion may be subjected to re-circulation for repeated coating. Preferably, the encapsulating chamber is arranged such that the particles pass upwards through the encapsulating zone, then are dispersed into slower moving air and sink back to the base of the encapsulating chamber, enabling repeated passes of the particles through the encapsulating zone until the desired encapsulating shell thickness is achieved.

Centrifugal Extrusion:

Anode active materials may be encapsulated using a rotating extrusion head containing concentric nozzles. In this process, a stream of core fluid (slurry containing particles of an anode active material dispersed in a solvent) is surrounded by a sheath of shell solution or melt. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational Nozzle Method:

Core-shell encapsulation of an anode active material can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·s): emulsions, suspensions or slurry containing the anode active material. The solidification can be done according to the used gelation system with an internal gelation (e.g. sol-gel processing, melt) or an external (additional binder system, e.g. in a slurry).

Spray-Drying:

Spray drying may be used to encapsulate particles of an active material when the active material is suspended in a melt or polymer solution. In spray drying, the liquid feed (solution or suspension) is atomized to form droplets which, upon contacts with hot gas, allow solvent to get vaporized and thin polymer shell to fully embrace the solid particles of the active material.

Coacervation-Phase Separation:

This process consists of three steps carried out under continuous agitation:

(a) Formation of three immiscible chemical phases: liquid manufacturing vehicle phase, core material phase and encapsulation material phase. The core material is dispersed in a solution of the encapsulating polymer (elastomer or its monomer or oligomer). The encapsulating material phase, which is an immiscible polymer in liquid state, is formed by (i) changing temperature in polymer solution, (ii) addition of salt, (iii) addition of non-solvent, or (iv) addition of an incompatible polymer in the polymer solution.

(b) Deposition of encapsulation shell material: core material being dispersed in the encapsulating polymer solution, encapsulating polymer material coated around core particles, and deposition of liquid polymer embracing around core particles by polymer adsorbed at the interface formed between core material and vehicle phase; and (c) Hardening of encapsulating shell material: shell material being immiscible in vehicle phase and made rigid via thermal, cross-linking, or dissolution techniques.

Interfacial Polycondensation and Interfacial Cross-Linking:

Interfacial polycondensation entails introducing the two reactants to meet at the interface where they react with each other. This is based on the concept of the Schotten-Baumann reaction between an acid chloride and a compound containing an active hydrogen atom (such as an amine or alcohol), polyester, polyurea, polyurethane, or urea-urethane condensation. Under proper conditions, thin flexible encapsulating shell (wall) forms rapidly at the interface. A solution of the anode active material and a diacid chloride are emulsified in water and an aqueous solution containing an amine and a polyfunctional isocyanate is added. A base may be added to neutralize the acid formed during the reaction. Condensed polymer shells form instantaneously at the interface of the emulsion droplets. Interfacial cross-linking is derived from interfacial polycondensation, wherein cross-linking occurs between growing polymer chains and a multi-functional chemical groups to form an elastomer shell material.

In-Situ Polymerization:

In some micro-encapsulation processes, active materials particles are fully coated with a monomer or oligomer first. Then, direct polymerization of the monomer or oligomer is carried out on the surfaces of these material particles.

Matrix Polymerization:

This method involves dispersing and embedding a core material in a polymeric matrix during formation of the particles. This can be accomplished via spray-drying, in which the particles are formed by evaporation of the solvent from the matrix material. Another possible route is the notion that the solidification of the matrix is caused by a chemical change.

It may be noted that the anode active material (e.g., prelithiated or non-lithiated Si nano particles) may be coated with a carbonizable coating material (e.g., phenolic resin, poly(furfuryl alcohol), coal tar pitch, or petroleum pitch). The coating can then be carbonized to produce an amorphous carbon or polymeric carbon coating on the surface of these Si particles. Such a conductive surface coating can help maintain a network of electron-conducting paths during repeated charge/discharge cycles and prevent undesirable chemical reactions between Si and electrolyte from happening. Hence, the presently invented method may further comprise a step of coating a surface of the fine particles with a thin layer of carbon having a thickness less than 1 μm prior to the formation of the protective layer. The thin layer of carbon preferably has a thickness less than 100 nm. Such a thin layer of carbon may be obtained from pyrolization of a polymer, pitch, or organic precursor or obtained by chemical vapor deposition, physical vapor deposition, sputtering, etc.

Alternatively, the particles of an anode active material may be coated with a layer of graphene, electron-conducting polymer, or ion-conducting polymer. Such coating processes are well-known in the art. These coated particles are then subjected to pre-lithiation and then partial de-lithiation.

In the preparation of an anode electrode, acetylene black (AB), carbon black (CB), or ultra-fine graphite particles may be used as a conductive additive. Conductive additives may comprise an electrically conductive material selected from the group consisting of electro-spun nano fibers, carbonized electro-spun nano fibers, vapor-grown carbon or graphite nano fibers, carbon or graphite whiskers, carbon nano-tubes, nano-scaled graphene platelets, metal nano wires, metal-coated nano wires, carbon-coated nano wires, metal-coated nano fibers, carbon-coated nano fibers, and combinations thereof. A binder material may be chosen from polytetrafluoroethylene (PTFE), polyvinylidene fluoride (PVDF), ethylene-propylene-diene copolymer (EPDM), or styrene-butadiene rubber (SBR), for example. Conductive materials such as electronically conductive polymers, meso-phase pitch, coal tar pitch, and petroleum pitch may also be used as a binder. A typical mixing ratio of these ingredients is 80 to 85% by weight for the anode active material, 5 to 15% by weight for the conductive additive, and 5 to 10% by weight for the binder. The current collector may be selected from aluminum foil, stainless steel foil, and nickel foil. There is no particularly significant restriction on the type of current collector, provided the material is a good electrical conductor and relatively corrosion resistant. The separator may be selected from a polymeric nonwoven fabric, porous polyethylene film, porous polypropylene film, or porous PTFE film.

The electrode fabrication may comprise combining multiple fine particles of prelithiated/delithiated anode active material with a conductive additive and/or a binder material, plus a desired amount of another type of anode active materials selected from particles of graphite, hard carbon, soft carbon, meso-carbon micro-bead, surface-modified graphite, carbon-coated graphite, or a combination thereof.

Hence, a lithium ion battery may contain an anode that comprises at least two types of anode active material wherein at least one type of active material is prelithiated (e.g., Si and Sn) and at least one type of active material is not prelithiated (e.g., carbonaceous material, such as graphite, hard carbon, soft carbon, surface-modified graphite, chemically modified graphite, or meso-carbon micro-beads, MCMBs). Fully prelithiated anode active materials are generally unstable in regular room air, unless partially de-lithiated to have substantially lithium-free surfaces. The present disclosure enables the battery to contain an anode that comprises at least a non-carbon active material possessing an ultra-high lithium absorbing capacity (e.g., Si that exhibits a specific capacity up to 4,200 mAh/g). The battery comprises an anode that contains an extra amount of lithium to compensate for the formation of SEI layers beforehand, in addition to providing enough lithium to intercalate into (or form a compound with) a cathode active material.

The present disclosure allows the extra amount of lithium to be pre-stored in an anode active material. The capacity limitation is on the cathode side, rather than the anode side. The present approach obviates the need for the cathode to supply the extra amount of needed lithium, thereby further reducing the needed initial weight of the cathode or increasing the cathode weight that can be incorporated in a cell. This strategy can increase the overall capacity of a lithium ion battery by another 20%-30%.

There is no limitation on the types of cathode materials that can pair up with the presently invented anode materials. The positive electrode (cathode) active material may be selected from both lithium-free and lithium-containing materials. For instance, the cathode active material may be selected from a wide variety of metal oxides, such as lithium-containing nickel oxide, lithium-containing cobalt oxide, lithium-containing nickel-cobalt oxide, lithium-containing vanadium oxide, lithium iron phosphate, lithium manganese phosphate, lithium manganese-iron phosphate, and other lithium metal (or mixed metals) phosphate. Positive electrode active material may also be selected from chalcogen compounds, such as titanium disulfate or molybdenum disulfate. More preferred are lithium cobalt oxide (e.g., $Li_xCoO_2$ where $0.8 \leq x \leq 1$), lithium nickel oxide (e.g., $LiNiO_2$), lithium manganese oxide (e.g., $LiMn_2O_4$ and $LiMnO_2$), lithium iron phosphate, lithium manganese-iron phosphate, lithium vanadium phosphate because these oxides provide a relatively high cell voltage and relatively good cycling stability.

Lithium cobalt oxide ($LiCoO_2$) is one of the most important cathode materials used in lithium-ion secondary batteries. $LiCoO_2$ and other similar lithium transition metal oxides, such as lithium manganese oxide, lithium nickel oxide, and lithium vanadium oxide, can be prepared by various methods using different lithium and transition metal sources. In general, bulk transition metal oxides are prepared by solid-state reactions, which involve repeated heat processes at high temperatures. Such processes generally afford the thermodynamically more stable phases and in general, microcrystalline materials are obtained. Lower temperatures and mild processing conditions may be used for several methods, such as co-precipitation, sol-gel process with/without template, synthesis by precursor, ion-exchange reaction and hydrothermal. These methods also result in particles with better control of morphology and smaller size. Other methods include flame spray pyrolysis, dehydro-freezing evaporation, supercritical dehydration, supersonic hydrothermal synthesis, and ultrasonic processing.

As an example, a process for producing lithium-cobalt oxide my include (a) mixing cobalt oxide having an average particle size of not more than 0.1 μm, with a lithium compound; and (b) calcining the obtained mixture at a temperature of 500 to 850° C. As compared to the conventional processes that begin with larger cobalt oxide particles (e.g., diameter >10 μm), such a process is advantageous in that lithium-cobalt oxide particles (1) can be produced with a short calcination time, (2) have a narrow particle size distribution, and (3) have a uniform small particle size.

The flame-spray pyrolysis method may include the steps of: (a) spraying minute droplets containing a solution of dissolved lithium salt and cobalt salt at room temperature; (b) atomizing the minute droplets through rapid expansion into a high temperature environment generated by combusting oxygen and hydrogen; (c) decomposing and oxidizing the atomized minute droplets thermally at high temperature to produce nano-sized oxides in gaseous phase; and (d) collecting the produced nano-sized composite oxides particles.

Lithium iron phosphate $LiFePO_4$ is a promising candidate of cathode material for lithium-ion batteries. The advantages of $LiFePO_4$ as a cathode active material includes a high theoretical capacity (170 mAh/g), environmental benignity, low resource cost, good cycling stability, high temperature capability, and prospect for a safer cell compared with $LiCoO_2$. A major drawback with this material is that it has very low electronic conductivity, on the order of $10^{-9}$ S/cm$^2$. This renders it difficult to prepare cathodes capable of operating at high rates. In addition, poor solid-phase transport means that the utilization of the active material is a strong function of the particle size. This major problem may be overcome by using a nano-scaled powder (to reduce the Li ion diffusion path and electron transport path distance) and doping the powder with a transition metal. Lithium iron phosphate ($LiFePO_4$) nano particles may be prepared by ball milling of conventional micron-sized particles, which may be prepared by a solid state reaction using $LiOH.H_2O$, $(CH_3COO)_2Fe$, and $NH_4H_2PO_4$ as raw materials. Additionally, $Li_{1.3}Al_{0.3}Ti_{1.7}(PO_4)_3$ materials, as an example of lithium mixed-metal phosphate, may be successfully prepared by the solution deposition using lithium acetate, aluminum nitrate, ammonium dihydrogen phosphate and titanium butoxide as starting materials. The resulting material may be ball-milled to sub-micron or nanometer scales. This is but one example of a host of complex metal phosphate-based cathode materials.

A wide range of electrolytes can be incorporated into the lithium cells. Most preferred are non-aqueous and polymer gel electrolytes although other types can be used. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (.gamma.-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range from 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methane-sulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably from 0.5 to 2.0 mol/l.

Example 1: Production of SEIs in Cobalt Oxide ($Co_3O_4$) Particles and Graphite Particles in an Electrochemical Reactor Prior to being Incorporated into an Anode of a Li-Ion Cell An appropriate amount of inorganic salts $Co(NO_3)_2.6H_2O$ and ammonia solution ($NH_3.H_2O$, 25 wt. %) were mixed together. The resulting suspension was stirred for 2 hours under an argon flow to ensure a complete reaction. The obtained $Co(OH)_2$ precursor suspension was calcined at 450° C. in air for 2 h to form particles of the layered $Co_3O_4$. Portion of the $Co_3O_4$ particles was then encapsulated with a phenolic resin, which was then carbonized at 500° C. for 2 hours and 900° C. for another 2 hours.

Samples of carbon-coated $Co_3O_4$ particles and artificial graphite particles, separately, were then electrochemically lithiated to produce prelithiated particles, which were then de-lithiated to create artificial SEI. The procedure was repeated 5 times to add additional SEI to the anode materials and to pre-occupy the defect sites which could trap or retain lithium ions. Some of the prelithiated particles and, separately, some of the non-lithiated particles were then surface-protected by a layer of PEO using a pan-coating method. These efforts were made to evaluate how the strategy of pre-forming SEIs affects the first-cycle efficiency and the Coulomb efficiencies of subsequent cycles or cycling stability.

For electrochemical testing, the working electrodes were prepared by mixing 85 wt. % active material (carbon-protected or non-protected particulates of $Co_3O_4$ with or without pre-formed SEI), 7 wt. % conductive fillers (e.g. Super-P), and 8 wt. % polyvinylidene fluoride (PVDF) binder dissolved in N-methyl-2-pyrrolidinoe (NMP) to form a slurry of 5 wt. % total solid content. After coating the slurries on Cu foil, the electrodes were dried at 120° C. in vacuum for 2 h to remove the solvent before pressing. Then, the electrodes were cut into a disk ($\phi$=12 mm) and dried at 100° C. for 24 h in vacuum. Electrochemical measurements were carried out using CR2032 (3V) coin-type cells with lithium metal as the counter/reference electrode, Celgard 2400 membrane as separator, and 1 M $LiPF_6$ electrolyte solution dissolved in a mixture of ethylene carbonate (EC) and diethyl carbonate (DEC) (EC-DEC, 1:1 v/v). The cell assembly was performed in an argon-filled glove-box. The CV measurements were carried out using an electrochemical workstation at a scanning rate of 1 mV/s.

The electrochemical performance of the particulates of $Co_3O_4$ and artificial graphite particles with or without pre-formed SEIs were evaluated by galvanostatic charge/discharge cycling at a current density of 50 mA/g, using an electrochemical testing workstation.

Figure 2A:
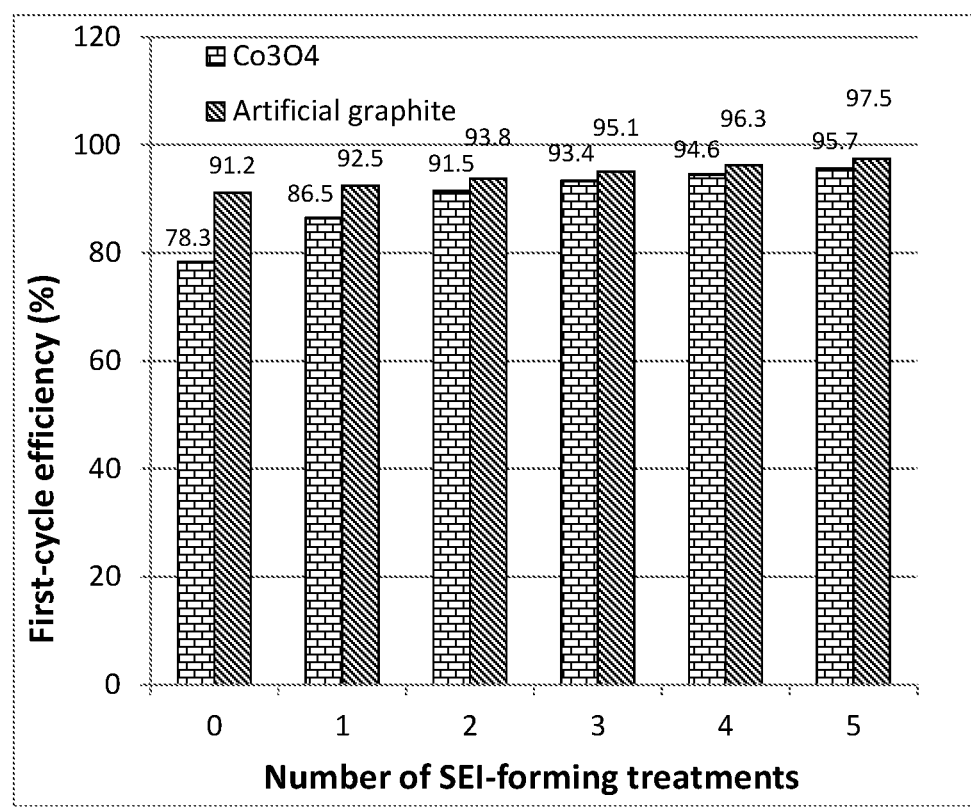
FIG. 2(A) The first-cycle efficiency data of two series of cells (one containing a $Co_3O_4$-based anode and the other an artificial graphite-based anode) each as a function of the number of repeated lithiation/de-lithiation procedures (number of SEI-forming procedures); n=0 means no such procedure, n=1 means one round of lithiation/de-lithiation, etc.

Summarized in FIG. 2(A) are the specific capacities of the first-cycle efficiency data of two series of cells (one containing a $Co_3O_4$-based anode and the other an artificial graphite-based anode) each as a function of the number of repeated lithiation/de-lithiation procedures; (number of SEI-forming procedures, n=0 means no such procedure, n=1 means one round of lithiation/de-lithiation, and n=2 means 2 rounds of lithiation/de-lithiation procedures, etc. These data have demonstrated that the first-cycle efficiency of a high-capacity anode active material can be increased from 78.3% to 95.7%. This implies that the amount of lithium ions originally stored in the cathode (e.g. a lithium transition metal oxide) of a lithium-ion cell will only suffer a 4.3% loss during the first charge/discharge cycle of the resulting lithium-ion cell. This is in stark contrast to a 21.7% loss of lithium for a lithium-ion cell featuring an anode material not previously subjected to SEI-forming treatments. For pre-treated graphite particles, the first-cycle efficiency as high as 97.5% can be achieved after repeated the SEI-forming treatments for a total of 5 times. This is unprecedented.

Figure 2B:
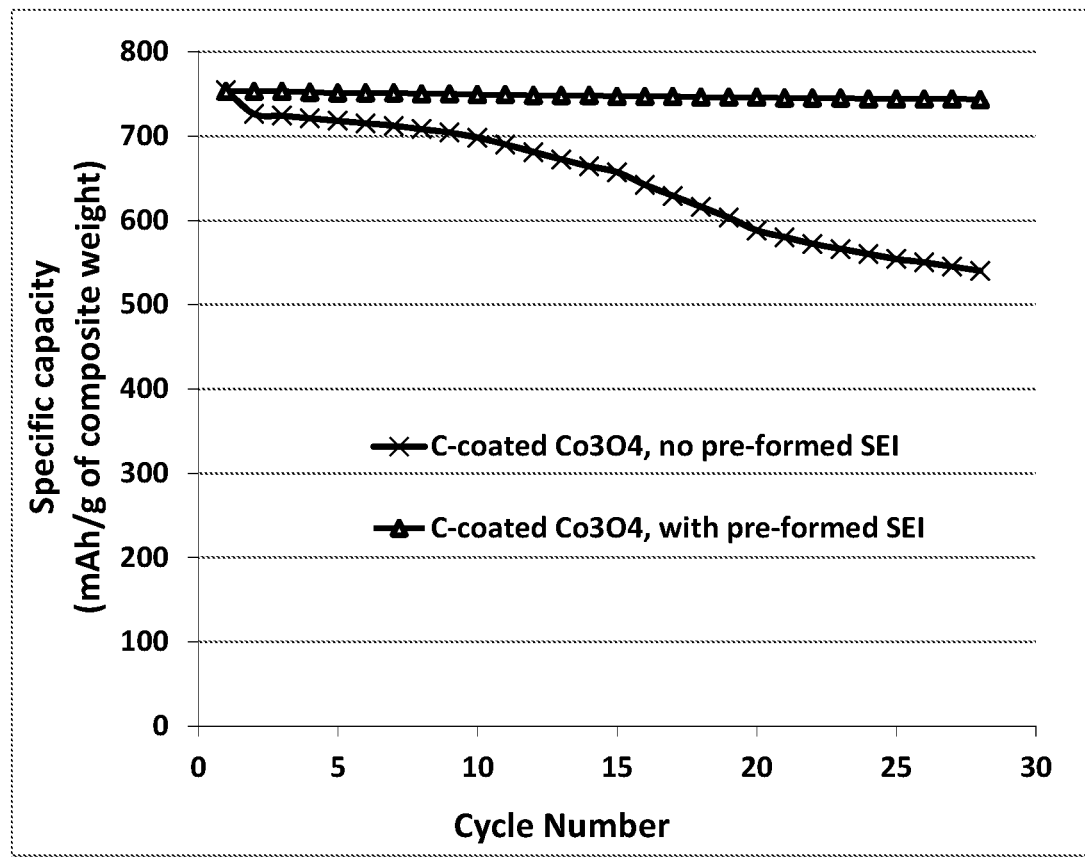
FIG. 2(B) The specific capacities of 2 lithium batteries: one having an anode active material featuring carbon-coated $Co_3O_4$ particles (no pre-formed SEI) and the other featuring carbon-coated $Co_3O_4$ particles (having undergone 3 SEI-forming procedures; i.e. 3 rounds of lithiation/delithiation).

FIG. 2(B) shows the specific capacities of 2 lithium batteries: one having an anode active material featuring carbon-coated $Co_3O_4$ particles (no pre-formed SEI) and the other featuring carbon-coated $Co_3O_4$ particles (having undergone 3 SEI-forming procedures; i.e. 3 rounds of lithiation/delithiation). These data have also demonstrated the advantage that the invented SEI pre-forming treatments could significantly improve the cycling stability of a lithium-ion cell.

Example 2: Polymer-Stabilized Tin Oxide Particles Having Pre-Formed SEI

Tin oxide ($SnO_2$) nano particles were obtained by the controlled hydrolysis of $SnCl_4.5H_2O$ with NaOH using the following procedure: $SnCl_4.5H_2O$ (0.95 g, 2.7 m-mol) and NaOH (0.212 g, 5.3 m-mol) were dissolved in 50 mL of distilled water each. The NaOH solution was added dropwise under vigorous stirring to the tin chloride solution at a rate of 1 mL/min. This solution was homogenized by sonication for 5 m in. Subsequently, the resulting hydrosol was reacted with $H_2SO_4$. To this mixed solution, few drops of 0.1 M of $H_2SO_4$ were added to flocculate the product. The precipitated solid was collected by centrifugation, washed with water and ethanol, and dried in vacuum. The dried product was heat-treated at 400° C. for 2 h under Ar atmosphere.

Samples of various different tin oxide particles were subjected to electrochemical prelithiation using lithium hexafluorophosphate ($LiPF_6$) as the salt dissolved in EC-PC (50/50) as an electrolyte solution and lithium metal as a counter-electrode. The prelithiated particles were subjected to a de-lithiation treatment (by reversing the electrical current direction). The lithiation/delithiation cycles were repeated 3 times to produce particles having pre-formed SEIs. Both treated and non-treated $SnO_2$ particles were then dispersed in a poly(acrylonitrile) (PAN)-solvent solution, Subsequently, PAN-protected $SnO_2$ particles were produced using spray-drying.

Figure 3:
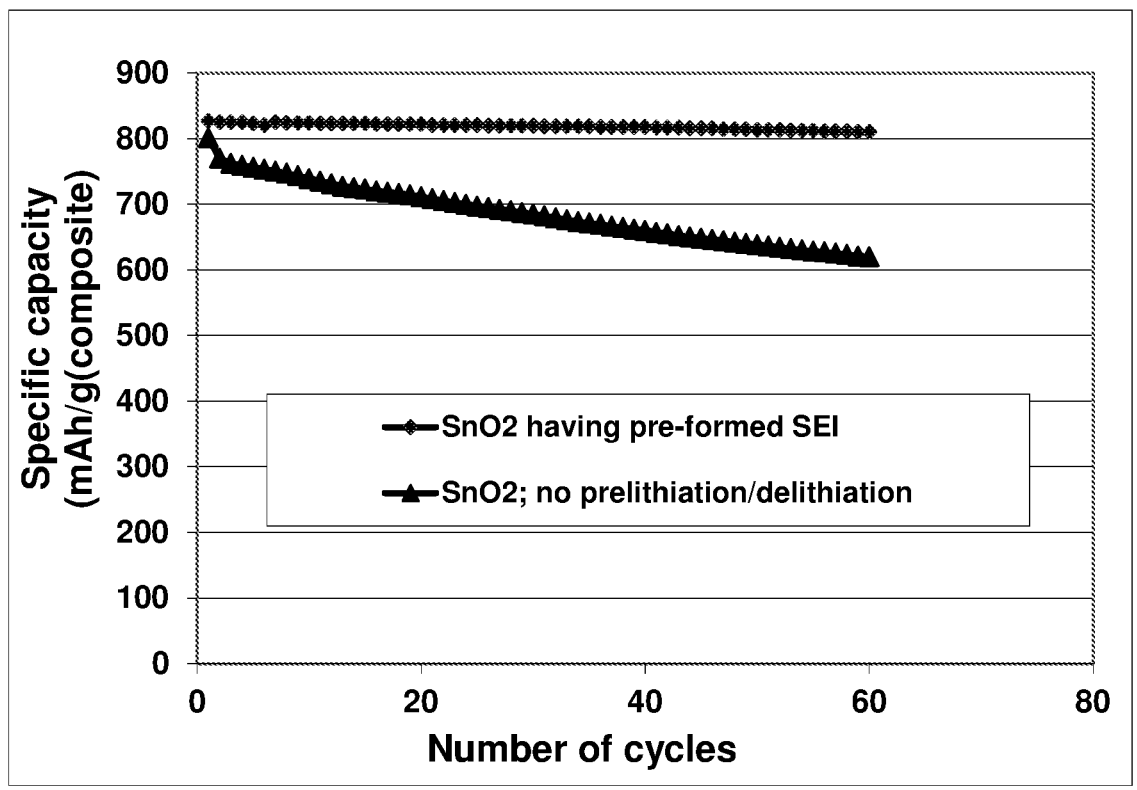
FIG. 3 The specific capacities of two lithium batteries one having an anode active material featuring $SnO_2$ particles that are polymer-protected and have undergone 3 rounds of lithiation/delithiation procedures and the other, polymer-protected but have never been pre-lithiated/delithiated prior to being used as an anode material.

The battery cells from these nano-scaled $SnO_2$ particles (with or without surface protection species or SEI-forming treatment) were prepared using a procedure described in Example 1. Shown in FIG. 3 are the specific capacities of two lithium batteries one having an anode active material featuring $SnO_2$ particles that are polymer-protected and have undergone 3 rounds of lithiation/delithiation procedure and the other, polymer-protected but have not been pre-lithiated/delithiated prior to being used as an anode material. These data again demonstrate that the invented SEI pre-forming treatments could significantly improve the cycling stability of a lithium-ion cell.

Example 3: Polymer-Stabilized Prelithiated Tin (Sn) Nano Particles Having Pre-Formed SEI Nano particles (76 nm in diameter) of Sn were encapsulated with a thin layer of phenolic resin shell via the spray-drying method, followed by a heat treatment from 350-600° C. for 4 hours to obtain carbon-coated Sn nano particles. Half of these C-coated Sn particles were subjected to repeated prelithiation/delithiation treatments (6 times), and encapsulation by polyethylene glycol methyl ether (PEG-me) by dispersing the carbon-coated and lithiation/delithiation-treated Sn nano particles in a PEG-me/ethanol solution, followed by spray-drying. Non-treated Sn nano particles from the same batch were also investigated to determine and compare the cycling behaviors of the lithium-ion batteries containing these particles as the anode active material.

Figure 4:
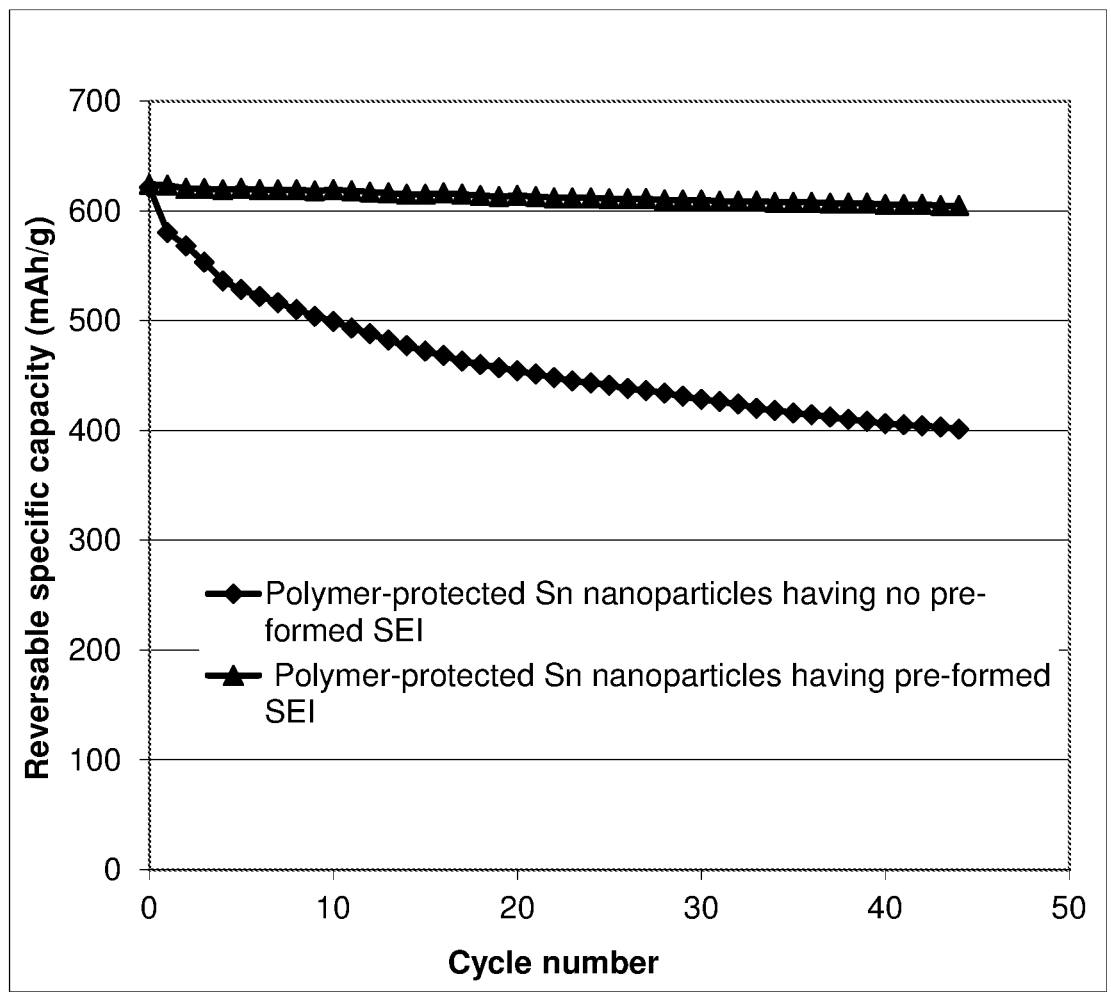
FIG. 4 The specific capacities of two lithium batteries: one having an anode active material featuring polymer-protected pre-lithiated/delithiated Sn particles having pre-formed SEI and the other having polymer-encapsulated Sn particles, but no pre-formed SEI.

Shown in FIG. 4 are the specific capacities of two lithium batteries: one having an anode active material featuring polymer-protected lithiation/delithiation-treated Sn particles and the other having polymer-encapsulated Sn particles, but no lithiation/delithiation treatments. These results have clearly demonstrated that the presently invented repeated lithiation/delithiation treatments and encapsulation of carbon-coated Sn particles by a polymer protecting layer provides excellent protection against capacity decay of a lithium-ion battery. Carbon encapsulation is not good enough to provide the necessary protection.

Example 4: Surface-Protected Lithiation/Delithiation-Treated Si Nanowire-Based Anode Materials Si nanowires, having a diameter range from 19 to 28 nm, were supplied from Angstron Energy Co. (Dayton, Ohio). Some Si nanowires were coated with a layer of graphene sheets using spray-drying of Si nanowire/graphene oxide/water suspension. The graphene-coated Si nanowires were then subjected to repeated prelithiation/delithiation treatments (10 times) using an electrochemical procedure. Some treated Si nano wires were further encapsulated by a thin layer of PPO composite containing $Li_2O$ and LiF dispersed therein. For comparison purposes, Si nanowires protected by graphene coating (but no repeated lithiation/delithiation treatment) were also prepared and implemented in a separate lithium-ion cell. In all the cells, approximately 20% of non-lithiated graphite particles were mixed with the Si nanowires (SiNW), along with 5% binder resin, to make an anode electrode.

Figure 5:
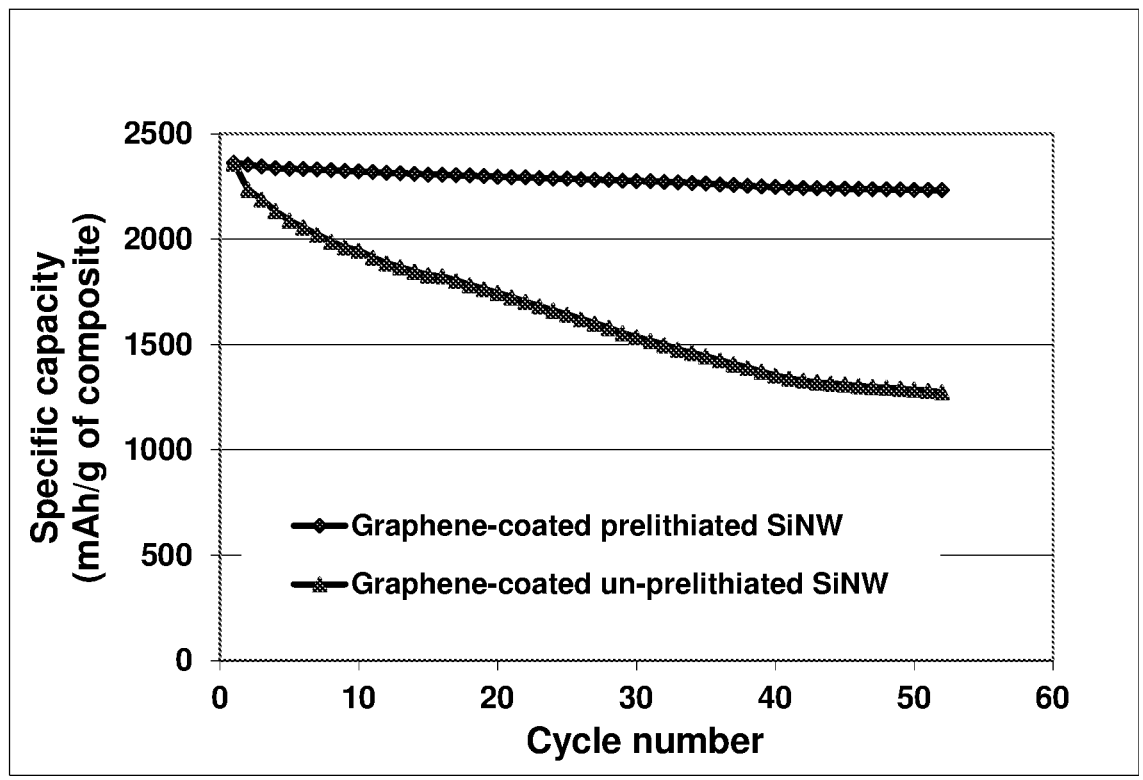
FIG. 5 Specific capacities of two lithium-ion cells, one having graphene-coated Si nanowires (SiNW without pre-formed SEI) as the anode active material and the other graphene-coated SiNWs having pre-formed SEIs.

FIG. 5 shows the specific capacities of two lithium-ion cells, one having graphene-coated un-treated Si nanowires (SiNW) as the anode active material and the other graphene-coated SiNWs (with repeated lithiation/delithiation treatments). These data indicate that polymer-protected, repeated lithiation/delithiation treated graphene-coated Si nanowires provide a more stable cycling response. Repeated lithiation/delithiation treatment also improve the first-cycle efficiency (from 84.5% to 95.6%, for instance) and Coulomb efficiencies of subsequent cycles (typically >99.8% vs. 95% of conventional cells featuring Si anode).

The invention claimed is:

1. An anode active material for use in a lithium ion battery, wherein said anode active material is capable of reversibly storing lithium ions therein up to a maximum lithium storage capacity $C_{max}$ during a charge or discharge of said battery and said anode active material comprises an amount of solid-electrolyte interphase (SEI) on a surface or in an internal structure of said anode active material wherein the SEI is pre-formed prior to incorporating said anode active material in an anode electrode of said battery; and wherein said anode active material is selected from the group consisting of: (a) nickel (Ni); (b) alloys or intermetallic compounds of Cd with other elements; (c) carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites excluding silicon carbide; (d) salts and hydroxides of Sn; (e) lithium manganate, lithium niobium oxide, lithium titanium-niobium oxide, lithium aluminate, $ZnCo_2O_4$; and combinations thereof.

2. The anode active material of claim 1, wherein said anode active material comprises a plurality of particles having SEI pre-formed on a surface or in an internal structure of said particles.

3. The anode active material of claim 2, wherein said anode active material particle is coated with a layer of carbon, graphene, electron-conducting polymer, ion-conducting polymer, or a combination thereof that is disposed between said particle and said SEI.

4. The anode active material of claim 1, wherein said anode active material is in a form of nano particle, nano wire, nano fiber, nano tube, nano sheet, nano belt, nano ribbon, nano disc, nano platelet, or nano horn having a thickness or diameter from 0.5 nm to 100 nm.

5. The anode active material of claim 1, wherein the anode active material contains a lithium amount from 0.001 $C_{max}$ to 1 $C_{max}$ that is pre-loaded into said anode active material prior to being incorporated into an anode electrode of said battery.

6. A mass of anode active material powder comprising the anode active material of claim 1.

7. An anode electrode comprising said anode active material of claim 1, an optional conductive additive, and an optional binder.

8. A lithium-ion battery comprising the anode electrode of claim 7, a cathode electrode, and an electrolyte interposed between said anode electrode and said cathode electrode.

9. A particulate comprising a core and an encapsulating shell protecting said core, wherein said core comprises one or multiple anode active material particles of claim 3.

10. A method of producing multiple anode active material particles of claim 2, said method comprising:
(a) providing a plurality of particles of an anode active material;
(b) introducing an amount of lithium ions into said particles to form prelithiated particles that each contains solid-electrolyte interface (SEI) on a surface or in an internal structure of said particles, wherein said amount of lithium is from 1% to 100% of $C_{max}$, the maximum lithium content that can be contained in said anode active material;
(c) partially or fully de-lithiating said prelithiated particles by removing a desired amount of lithium from said prelithiated particles; and
(d) repeating step (b).

11. The method of claim 10, wherein said SEI comprises a lithium- or sodium-containing species selected from $Li_2CO_3$, $Li_2C_2O_4$, LiOH, LiCl, LiI, LiBr, $ROCO_2Li$, HCOLi, ROLi, $(ROCO_2Li)_2$, $(CH_2OCO_2Li)_2$, $Li_2S$, $Li_xSO_y$, $Li_4B$, $Na_4B$, $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, a combination thereof, a combination thereof with $Li_2O$ or LiF, or a combination of $Li_2O$ and LiF, wherein X=F, Cl, I, or Br, R=a hydrocarbon group, $0<x\le1$, $1\le y\le4$.

12. The method of claim 10, further comprising repeating step (c) after step (d).

13. The method of claim 10, further comprising repeating step (b) n times and repeating step (c) (n−1) times or n times wherein n=2-10.

14. The method of claim 10, wherein step (b) comprises electrochemically introducing an amount of lithium ions into said particles by operating an electrochemical reactor apparatus wherein the apparatus comprises (i) a working electrode containing said anode active material particles; (ii) a counter-electrode containing a lithium source or sodium source; (iii) a liquid electrolyte in ionic contact with the working electrode and the counter-electrode, said electrolyte containing a lithium salt, a sodium salt or a combination of liquid salt and sodium salt dissolved in a liquid solvent; and (iv) a power source that imposes an electric current or voltage between the working electrode and the counter-electrode.

15. The method of claim 14, wherein the lithium salt is selected from lithium carbonate ($Li_2CO_3$), lithium hydroxide (LiOH), lithium halogenide, lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoro-ethylsulfonylimide (LiBETI), lithium bis(trifluoromethanesulfonyl) imide, lithium bis(fluorosulfonyl)imide, lithium trifluoromethanesulfonimide (LiTFSI), an ionic liquid-based lithium salt, and combinations thereof.

16. The method of claim 14, wherein the sodium salt is selected from sodium carbonate, $Na_2CO_3$, sodium hydroxide, NaOH, sodium halogenide, sodium perchlorate, $NaClO_4$, sodium hexafluorophosphate, $NaPF_6$, sodium borofluoride, $NaBF_4$, sodium hexafluoroarsenide, $NaAsF_6$, sodium trifluoro-methanesulfonate, $NaCF_3SO_3$, bis-trifluoromethyl sulfonylimide sodium, $NaN(CF_3SO_2)_2$, sodium bis(oxalato)borate, NaBOB, sodium oxalyldifluoroborate, $NaBF_2C_2O_4$, sodium oxalyldifluoroborate, $NaBF_2C_2O_4$, sodium nitrate, $NaNO_3$, Na-Fluoroalkyl-Phosphates, $NaPF_3(CF_2CF_3)_3$, sodium bisperfluoro-ethylsulfonylimide, NaBETI, sodium bis(trifluoromethanesulphonyl)imide, sodium bis(fluorosulphonyl)imide, sodium trifluoromethanesulfonimide, NaTFSI, an ionic liquid-based sodium salt, or a combination thereof.

17. The method of claim 14, wherein the liquid solvent is selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

18. The method of claim 10, further comprising a step of depositing a protecting polymer layer to embrace at least one of said prelithiated particles, wherein said protecting polymer layer has a thickness from 0.5 nm to 5 μm, and a lithium ion conductivity from $10^{-8}$ S/cm to $5 \times 10^{-2}$ S/cm at room temperature.

19. The method of claim 18, wherein said protecting polymer layer contains a polymer selected from poly(ethylene oxide) (PEO), polypropylene oxide (PPO), poly(acrylonitrile) (PAN), poly(methyl methacrylate) (PMMA), poly (vinylidene fluoride) (PVdF), poly bis-methoxy ethoxyethoxide-phosphazenex, polyvinyl chloride, poly(vinylidene chloride), polydimethylsiloxane, poly(vinylidene fluoride)-hexafluoropropylene (PVDF-HFP), polyethylene glycol, polyethylene glycol methyl ether, polyethylene glycol dimethyl ether, a sulfonated polymer, or a combination thereof.

20. The method of claim 19, wherein said sulfonated polymer is selected from the group consisting of sulfonated polyaniline, sulfonated polypyrrole, sulfonated polythiophene, sulfonated polyfuran, a sulfonated bi-cyclic polymer, poly(perfluoro sulfonic acid), sulfonated poly (tetrafluoroethylene), sulfonated perfluoroalkoxy derivatives of polytetrafluoroethylene, sulfonated polysulfone, sulfonated poly (ether ketone), sulfonated poly (ether ether ketone), sulfonated polyimide, sulfonated styrene-butadiene copolymers, sulfonated polystyrene, sulfonated poly chloro-trifluoroethylene (PCTFE), sulfonated perfluoroethylene-propylene copolymer (FEP), sulfonated ethylene-chlorotrifluoroethylene copolymer (ECTFE), sulfonated poly vinylidenefluoride (PVDF), sulfonated copolymers of polyvinylidenefluoride with hexafluoropropene and tetrafluoroethylene, sulfonated copolymers of ethylene and tetrafluoroethylene (ETFE), sulfonated polybenzimidazole (PBI), their chemical derivatives, copolymers, blends, and combinations thereof.

21. The method of claim 19, said protecting polymer layer further comprises a lithium- or sodium-containing species dispersed therein and wherein said lithium- or sodium-containing species is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, $Li_4B$, $Na_4B$, $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, or a combination thereof, wherein X=F, Cl, I, or Br, R=a hydrocarbon group, $0<x \leq 1$, $1 \leq y \leq 4$.

22. The method of claim 18, wherein said step of depositing a protecting polymer layer includes a procedure selected from pan-coating, air-suspension coating, centrifugal extrusion, vibration nozzle, spray-drying, oven or furnace drying, ionotropic gelation, coacervation-phase separation, interfacial polycondensation, interfacial crosslinking, in-situ polymerization, or matrix polymerization.

23. The method of claim 18, said protecting polymer layer further comprises a lithium salt selected from lithium carbonate, $Li_2CO_3$, lithium hydroxide, LiOH, lithium halogenide (LiF, LiCl, LiI, or LiBr), lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroalkyl-phosphates (LiPF$_3$(CF$_2$CF$_3$)$_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, and combinations thereof.

24. The method of claim 10, wherein said anode active material particles are selected from the group consisting of: (a) silicon (Si), germanium (Ge), tin (Sn), lead (Pb), phosphorus (P), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, P, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium niobium oxide, lithium titanium-niobium oxide, lithium manganate, lithium aluminate, lithium-containing titanium oxide, lithium transition metal oxide, $ZnCo_2O_4$; (f) particles of graphite and carbon; and (g) combinations thereof.

25. The method of claim 10, wherein said anode active material comprises silicon and said prelithiated particles comprise a prelithiated silicon $Li_4Si$, $Li_{4.4}Si$, or $Li_xSi$, wherein numerical x is from 1 to 4.4.

26. The method of claim 10, wherein said step of providing particles of an anode active material comprises providing a doped semiconductor material selected from Si or Ge doped with n-type and/or p-type dopants.

27. The method of claim 10, further comprising a step of coating a surface of said prelithiated particles with a thin layer of carbon, graphene, or electron-conducting polymer, having a thickness from 0.5 nm to 1 μm, prior to step (b) or step (c).

28. The method of claim 27, wherein said thin layer of carbon is obtained from pyrolization of a polymer, pitch, or organic precursor or obtained by chemical vapor deposition, physical vapor deposition, or sputtering.

29. The method of claim 10, further comprising a procedure of combining said multiple anode active material particles and a binder material, plus optional conductive additives, into an anode electrode.

30. The method of claim 29, further comprising a procedure of combining said anode electrode with a cathode, and an electrolyte to form said battery.

* * * * *